United States Patent [19]

Takemoto et al.

[11] Patent Number: 5,458,333
[45] Date of Patent: Oct. 17, 1995

[54] GAME PARLOR SYSTEM WHICH ALLOWS A PLAYER TO PLAY A GAME BEFORE PAYING A CHARGE

[75] Inventors: Takatoshi Takemoto; Kazunari Kawashima, both of Tokyo, Japan

[73] Assignee: Kabushiki Kaisha Ace Denken, Tokyo, Japan

[21] Appl. No.: 211,845

[22] PCT Filed: Oct. 19, 1992

[86] PCT No.: PCT/JP92/01358

§ 371 Date: Apr. 18, 1994

§ 102(e) Date: Apr. 18, 1994

[87] PCT Pub. No.: WO93/07941

PCT Pub. Date: Apr. 29, 1993

[30] Foreign Application Priority Data

Oct. 18, 1991 [JP] Japan .................. 3-270650

[51] Int. Cl.[6] ...................................... A63F 9/24
[52] U.S. Cl. .................. 273/138 A; 273/435; 235/380
[58] Field of Search ................. 273/138 A, 85 CP, 273/435; 364/410–412; 194/205; 235/380

[56] References Cited

U.S. PATENT DOCUMENTS

| | | | |
|---|---|---|---|
| 4,689,742 | 8/1987 | Troy et al. | 364/412 |
| 4,764,666 | 8/1988 | Bergeron | 235/380 |
| 5,038,022 | 8/1991 | Lucero | 235/380 |
| 5,179,517 | 1/1993 | Sarbin et al. | 364/410 |
| 5,326,104 | 7/1994 | Pease et al. | 273/138 A |

FOREIGN PATENT DOCUMENTS

| | | |
|---|---|---|
| 59-108581 | 6/1984 | Japan . |
| 60-241478 | 11/1985 | Japan . |
| 61-26196 | 2/1986 | Japan . |
| 62-171058 | 10/1987 | Japan . |
| 63-9469 | 1/1988 | Japan . |
| 63-54186 | 3/1988 | Japan . |
| 1-94882 | 4/1989 | Japan . |
| 2-114729 | 4/1990 | Japan . |
| 3-92190 | 4/1991 | Japan . |
| 5076635 | 3/1993 | Japan .................. 273/138 A |

*Primary Examiner*—Jessica J. Harrison
*Attorney, Agent, or Firm*—Lowe, Price, LeBlanc & Becker

[57] ABSTRACT

A game parlor system which comprises a plurality of game machines (10), one or more adjustment devices (90) for adjustment based on the game play result at each of the game machines, a plurality of packing devices each for sealing a credit medium on which data certifying that credit is given is recorded, and a plurality of adjustment media for recording data containing the game result after a game is played. Each of the game machines comprises a mechanism (52) for sealing the credit medium in the packing device, a write section (51) for recording data representing the game result on the adjustment medium, and a section (53) for discharging the packing device in which the credit medium is sealed and the adjustment medium on which data is recorded by the write section. The adjustment device comprises a section (96a) for taking out the credit medium from the packing device, a read section (96b) for reading data recorded on the adjustment medium, and a data processing section (91a) for performing adjustment processing based on the data read by the adjustment medium read section.

20 Claims, 23 Drawing Sheets

FIG. 2
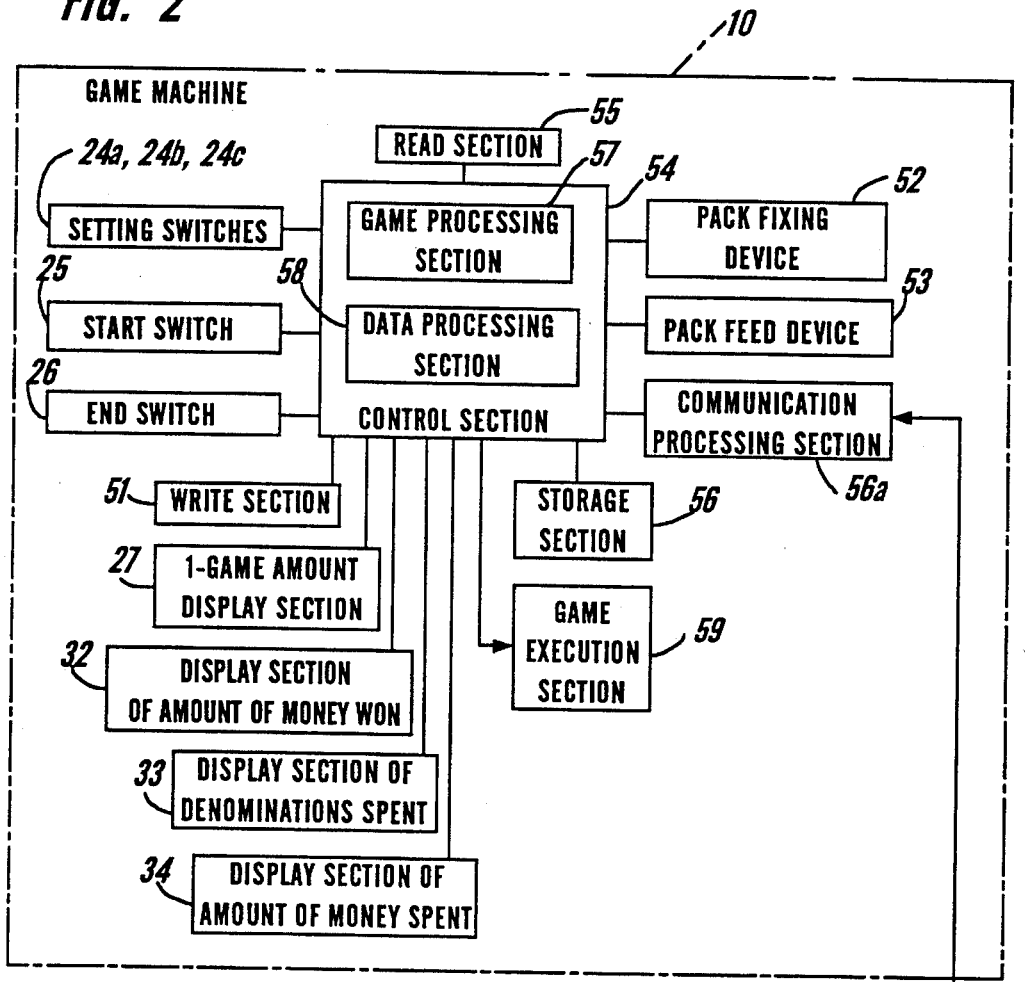
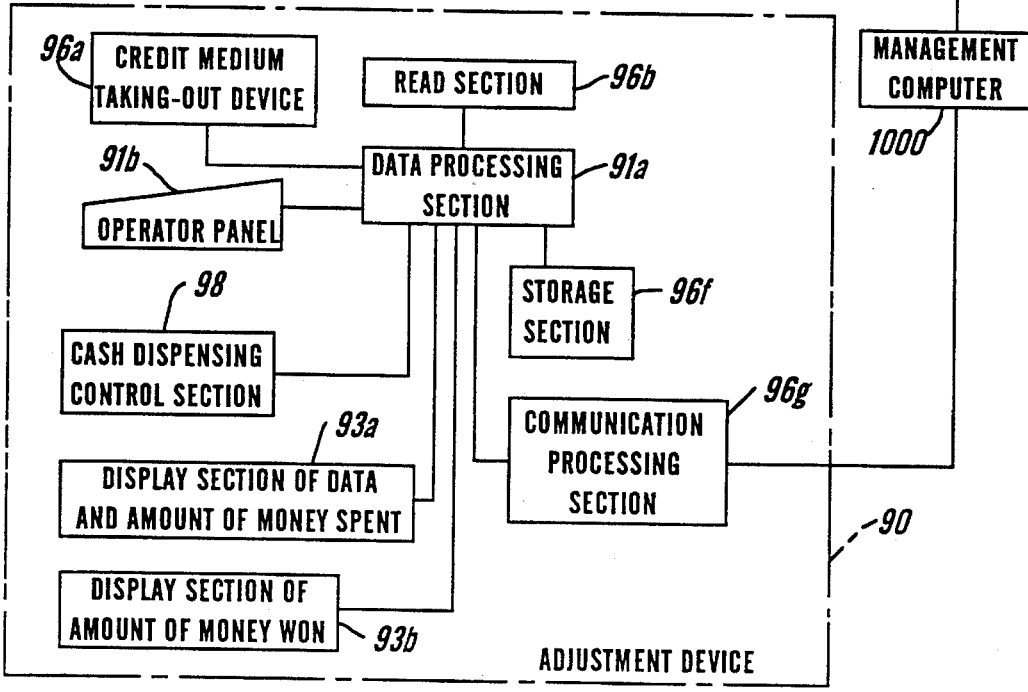

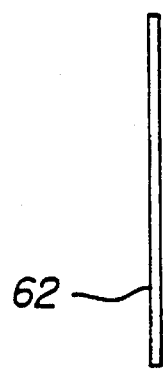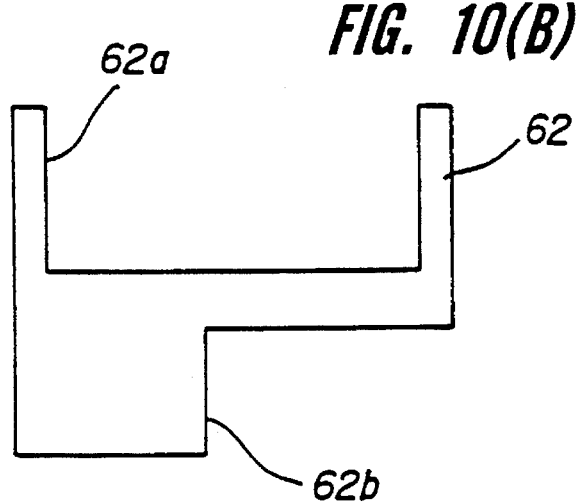
FIG. 10(A)
FIG. 10(B)

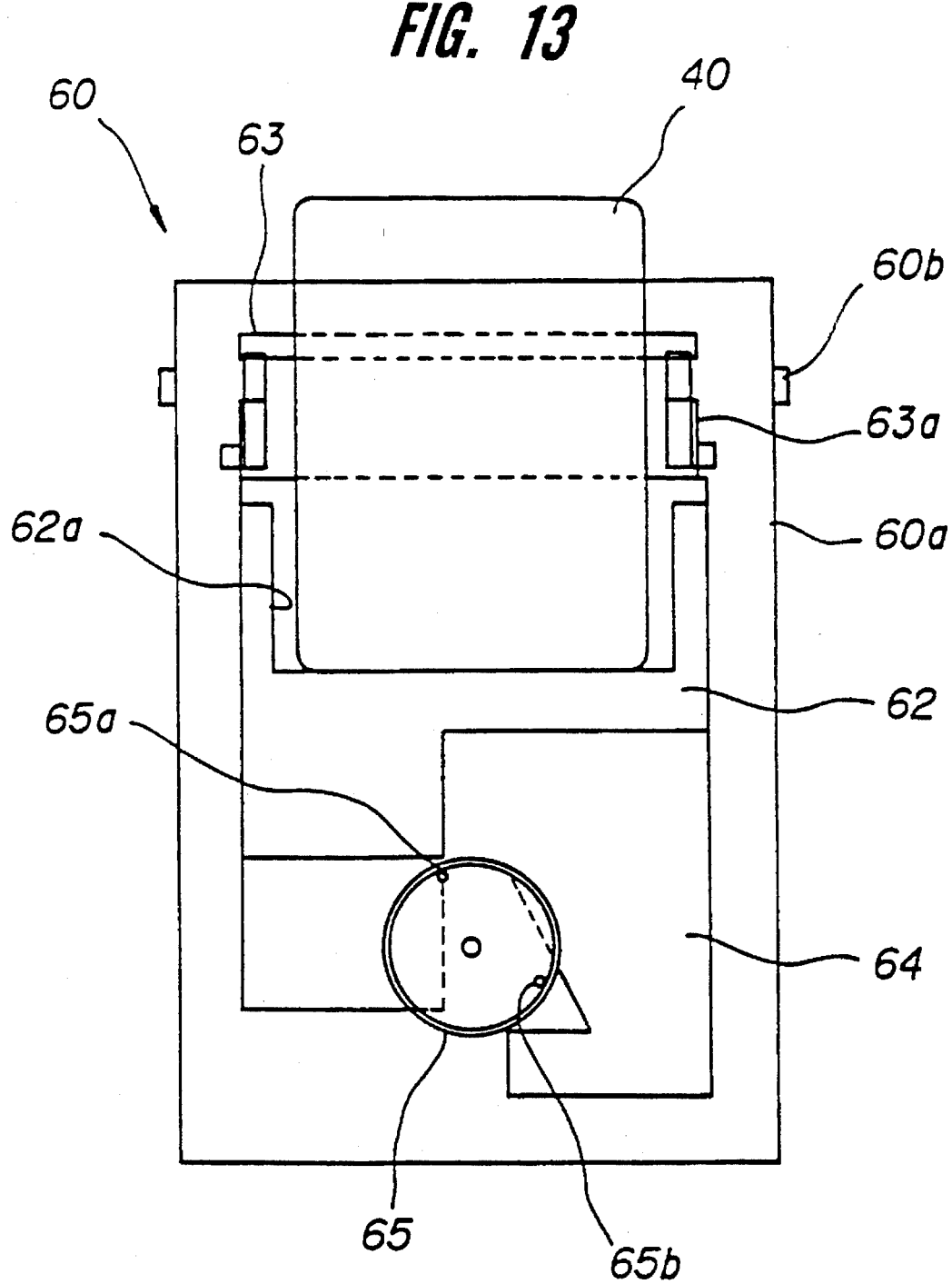

5,458,333

GAME PARLOR SYSTEM WHICH ALLOWS A PLAYER TO PLAY A GAME BEFORE PAYING A CHARGE

TECHNICAL FIELD

This invention relates to a game parlor system comprising game machines such as slot machines, a device for adjustment to the results of playing game machine games, and a device for packing a credit medium used to play game machine games, and in particular to a game parlor system which allows a player to play a game before paying a charge by using a credit medium for identifying a player's credit.

TECHNICAL BACKGROUND

Generally, a game parlor has a plurality of game machines and at least one adjustment device to pay out a prize to a player for winning games based on the game result. In recent years, for such game parlors, a system has been proposed in which the score on game machine games is kept on a prepaid card having a data record function and information recorded on the card is read by an adjustment device for managing the game play situation or exchanging the card for a prize based on the information.

However, since the art requires that a player should buy the card to play a game, the player cannot play any game if he or she does not have ready money. If the player spends all his or her ready money, he or she cannot continue playing games although to make a profit, the game parlor wants for him or her to continue playing games if the player can pay a charge.

DISCLOSURE OF INVENTION

It is an object of the invention to provide a game house system which enables a player to play a game before paying a charge if the player does not have ready money and enables a game parlor to make a profit, as well as game machines, an adjustment device, and packing devices used with the system.

To this end, according to one form of the invention, there is provided a game parlor system comprising at least a plurality of game machines each having a game execution section and one or more adjustment devices for adjustment based on the game play result at each of the game machines, wherein the improvement comprises:

a plurality of packing devices each for sealing a credit medium on which data certifying that credit is given is recorded; and a plurality of adjustment media for recording data containing the game result after a game is played, each of the game machines comprising:

a case having a slot for inserting the credit medium;

a switch for setting an amount of money to be spent for a game and a game end switch, the switches being installed on the case;

a mechanism for sealing the credit medium in the packing device;

a control section responsive to operating the setting switch for processing so that a game is played in the range of the setup amount of money and for processing data occurring as the game is played;

a write section responsive to operating the end switch for recording the result of data processing performed by the control section on the adjustment medium; and a section for discharging the packing device in which the credit medium is sealed and the adjustment medium on which data is recorded by the write section, the adjustment device comprising:

a case having a slot of the adjustment medium and the packing device sealing the credit medium;

a section for taking out the credit medium from the packing device inserted in the slot, a read section for reading data recorded on the adjustment medium; and a data processing section for performing adjustment processing based on the data read by the adjustment medium read section.

Each of the game machines can further include a credit medium read section for reading data recorded on the credit medium inside the slot.

The write section can be adapted to further write at least a part of data read by the credit medium read section onto the adjustment medium.

The adjustment medium can be disposed on the packing device, for example.

The game machine can also be adapted to accept at least one of a bill, a coin, and a prepaid card for use. The discharge section can be adapted to discharge an empty packing device containing no credit medium.

Each of the packing devices can further include a device for sending a signal for detecting taking-out of the packing device to the outside of the game parlor.

The game parlor system of the invention can further include a detector for detecting the signal sent by the signal sending device and sensing taking-out of the packing device. In this case, the game parlor system can further include an alarm which, when the detector detects taking-out of the packing device, receives a detection signal thereof and gives an alarm.

In the game parlor system according to the embodiment, at least some of the game machines can further include a game execution section for executing a game when a game play medium is loaded, a store section which stores the game play medium and has an inlet for loading the game play medium into the game execution section, and a dispensing control section being responsive to the game result at the game execution section for dispensing game play media through the store section in response to winning plays.

According to another form of the invention, there is provided a game machine comprising a case and a game execution section, wherein the improvement comprises:

a switch for setting an amount of money to be spent for a game, a game end switch, and a slot for inserting a credit medium on which data certifying that credit is given is recorded, the members being installed on the case;

a mechanism for sealing the credit medium in a packing device for sealing the same;

a control section responsive to operating of the setting switch for processing so that a game is played in the range of the setup amount of money and for processing data occurring as the game is played;

a write section responsive to operating the end switch for recording the result of data processing performed by the data processing section on a provided adjustment medium for recording data; and a section for discharging the packing device in which the credit medium is sealed and the adjustment medium on which data is recorded by the write section.

The game machine can further include a credit medium read section for reading data recorded on the credit medium inside the slot.

The write section can be adapted to further write at least a part of data read by the credit medium read section onto the adjustment medium.

The adjustment medium can be disposed on the packing device.

The game execution section, which is provided to execute a game when a game play medium is loaded, can further include a store section which stores the game play medium and has an inlet for loading the game play medium into the game execution section and a dispensing control section being responsive to the game result at the game execution section for dispensing game play media through the store section in response to winning plays.

According to a further form of the invention, there is provided an adjustment device for adjustment based on an adjustment medium, on which the game result is recorded, discharged from a game machine, wherein the improvement comprises:

a case having a slot for inserting the adjustment medium and the packing device sealing the credit medium on which data certifying that credit is given is recorded;

a section for taking out the credit medium from the packing device inserted in the slot, a read section for reading data recorded on the adjustment medium; and a data processing section for performing adjustment processing based on the data read by the adjustment medium read section.

The case can further include a display section which displays data on the credit medium, an amount of money spent, and an amount of money won read from the adjustment medium.

According to another form of the invention, there is provided a packing device for sealing a credit medium on which data certifying that credit is given is recorded, the device comprising:

a case having an internal space for housing the credit medium and a slot for inserting the credit medium into the internal space;

a holder for holding the credit medium inserted in the case; and a shutter disposed at the slot in such a manner that it can be opened and closed.

The case can be formed with an adjustment medium having a recording area where data can be read and written.

The packing device of the invention can further include a mechanism for opening and closing the shutter.

The mechanism can comprise:

a member for energizing in a direction of opening the slot;

a shutter cam being housed movably back and forth within the case for pushing out in a direction of closing the slot with the shutter when it advances;

a gear being housed rotatably in the case for displacing the shutter cam back and forth; and an insertion hole of a rotation drive member of a drive of the gear.

The gear can have a first pin engaged with the holder and a second pin engaged with the shutter cam and can have a structure whereby when the first pin moves as the holder retreats, the second pin moves in the direction of advancing the shutter cam and when the first pin moves in the direction of advancing the holder, the second pin moves in the direction of retreating the shutter cam.

The packing device of the invention can further include a device for sending a signal for detecting taking-out of the invention to the outside of a game parlor.

To play a game machine game, a player inserts a credit medium into the slot of the case. Then, the mechanism for sealing the credit medium in the packing device operates to seal the credit medium inserted in the slot in the packing device.

When the player operates the setting switch, the game processing section performs game processing in the range of the setup amount of money and the player can enjoy games in the range of the setup amount of money. The data processing section performs data processing based on the setup amount of money in response to operating of the setting switch and the result of game processing performed by the game processing section.

To end the game, the player operates the end switch. In response to the operating of the end switch, the write section records the result of data processing performed by the data processing section on the adjustment medium. The discharging section discharges the adjustment medium on which data is recorded by the write section and the packing device in which the credit medium is sealed. When the adjustment medium is separate from the packing device, they are discharged separately.

The player brings the discharged adjustment medium and packing device to the adjustment office or counter where adjustment is made based on the .data recorded on the adjustment medium. When the player has won more games than lost, payment of cash, prize exchange, etc., can be made. By making adjustment in deferred payment based on the credit medium, if the player does not have ready money, he or she can play a game for his or her desired extent. The player who wants to continue playing games is allowed to do so, even if the player spends all his or her ready money, for the game parlor to make a profit.

At the end of the game, the player must make adjustment at the adjustment office or counter regardless of whether or not he or she has won a game because the credit medium is sealed in the packing device. Therefore, the packing device in which the credit medium is sealed can be managed to prevent the player from running away without adjustment.

For the game machine where game play media are operated, a player can also enter game play media in the slot to play a game based on the amount of money corresponding to the number of entered game play media.

The data processing section performs data processing based on the amount of money corresponding to the number of entered game play media in the slot and the amount of money set in response to operating of the setting switch.

Based on the result of game processing performed by the game processing section, the game play media are discharged through the dispensing section by the dispensing control section. The player may enter the discharged game play media in the slot or bring them to the adjustment office or counter for adjustment. The player can enjoy sound or a matter sense of the game play media.

If the read section and the storage section are included, the data recorded on the credit medium inserted in the slot can be read by the read section and be stored in the storage section, thereby managing the credit medium and making the player make definite adjustment. The packing device, if it is provided with the adjustment medium, can prevent the player from forgetting to carry the adjustment medium to the adjustment office or counter when adjustment is made.

If the packing device in which the credit medium is sealed is inserted in the slot of the adjustment device, the credit medium can be taken out from the packing device by the extracting section. The data recorded on the adjustment medium of the packing device is read by the read section and stored in the storage section.

At the packing device, normally, the shutter is energized to open the slot. The gear is driven by the rotation drive member inserted in the insertion hole and the credit medium inserted in the slot is received at the holder, which then moves to the case inside together with the credit medium. In response to rotation of the gear, the second pin of the gear causes the shutter cam to advance. When the shutter cam advances, it pushes the shutter in the direction of closing the slot, and the slot is closed by the shutter. Thus, the credit medium is housed in the case and the shutter is closed.

To take out the credit medium, the rotation drive member is inserted in the insertion hole for rotating the gear.

In response to rotation of the gear, the first pin causes the holder to advance and the second pin causes the shutter cam to retreat. When the shutter cam retreats, the shutter opens the slot in response to applied power. After the shutter is thus opened, the holder is advanced, thereby advancing the credit medium at the same time, thereby pushing out the credit medium from within the case.

If the packing device has the signal sending device, personnel in the game machine can be informed that the packing device has been taken out to the outside of a predetermined district for preventing the player from running away with the packing device before adjustment.

BRIEF DESCRIPTION OF THE DRAWINGS

In the accompanying drawings:

FIG. 2 is a block diagram showing the configuration of one embodiment of a game parlor system of the invention;

FIG. 10 is a side view and a front view showing a holder of the packing device according to the first embodiment of the invention;

FIG. 13 is a front view showing the internal structure of the packing device from which a credit medium is pushed out according to the first embodiment of the invention;

BEST MODE FOR CARRYING OUT THE INVENTION

Referring now to the accompanying drawings, there are shown preferred embodiments of the invention.

Figure 23:
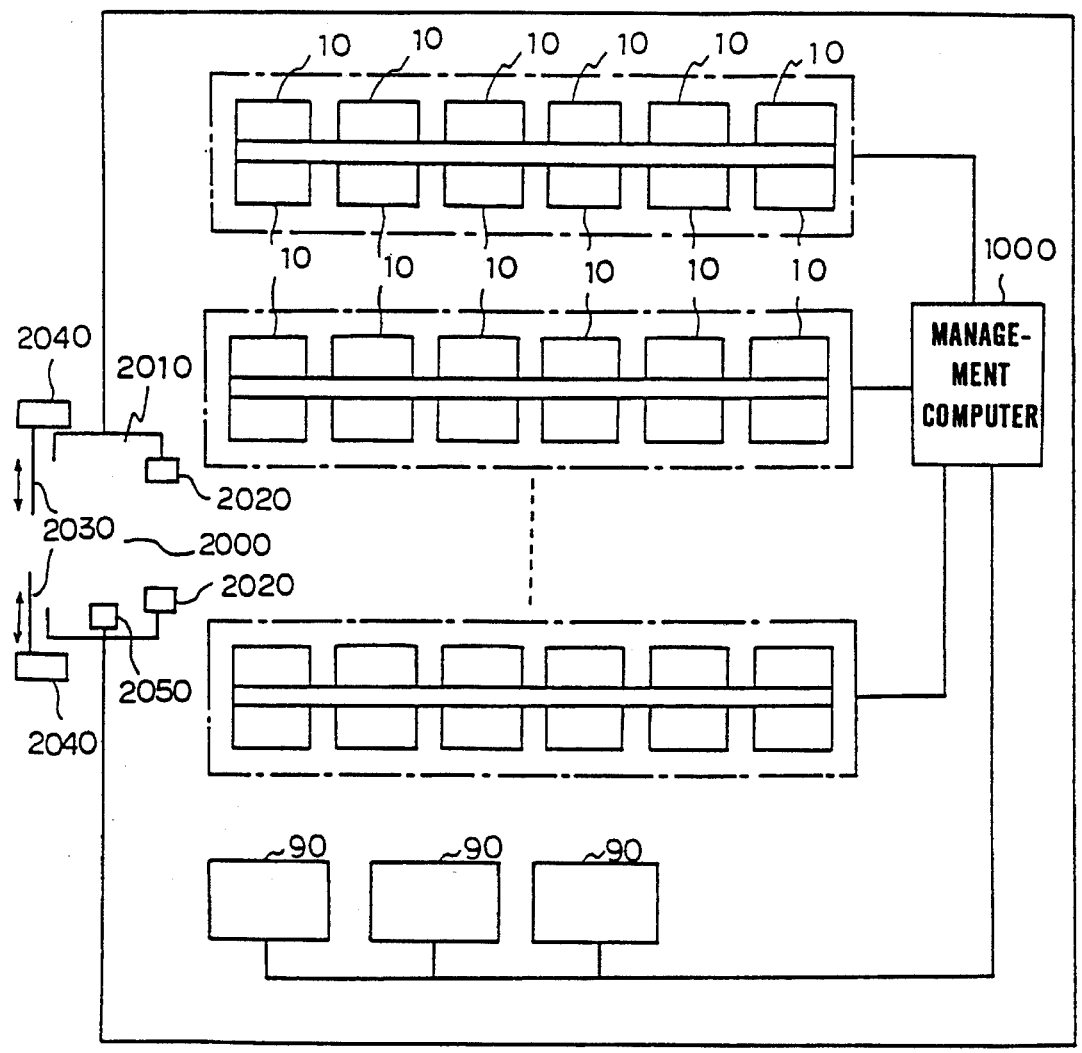
FIG. 23 is a block diagram showing an outline of the configuration of one embodiment of a game parlor system to which the invention is applied.

FIG. 23 shows an example of the configuration of a game parlor system. As shown in FIG. 23, the game parlor has a plurality of groups each consisting of two rows of game machines 10, the game machine groups being disposed like islands. The group of game machines 10 is generally called a game machine island. In addition, the game parlor has one or more adjustment device 90 for adjustment based on the data indicating the result of playing game machine games to exchange the score given to a player from a game machine 10 for a prize or the like corresponding the score. Further, the game parlor has a management computer 1000 and a monitor system 2000 to prevent players who finish playing games from going out of the game parlor before settling accounts.

In addition, the game parlor may have money changing machines, prepaid card selling machines, etc. To use game machines at which players play games with game play media, devices for lending the game play media are also installed.

Each game machine 10 and adjustment device 90 contain a communication processing section 56a and a communication processing section 96g respectively via which they are connected to the management computer 1000, as shown in FIG. 2.

Figure 1:
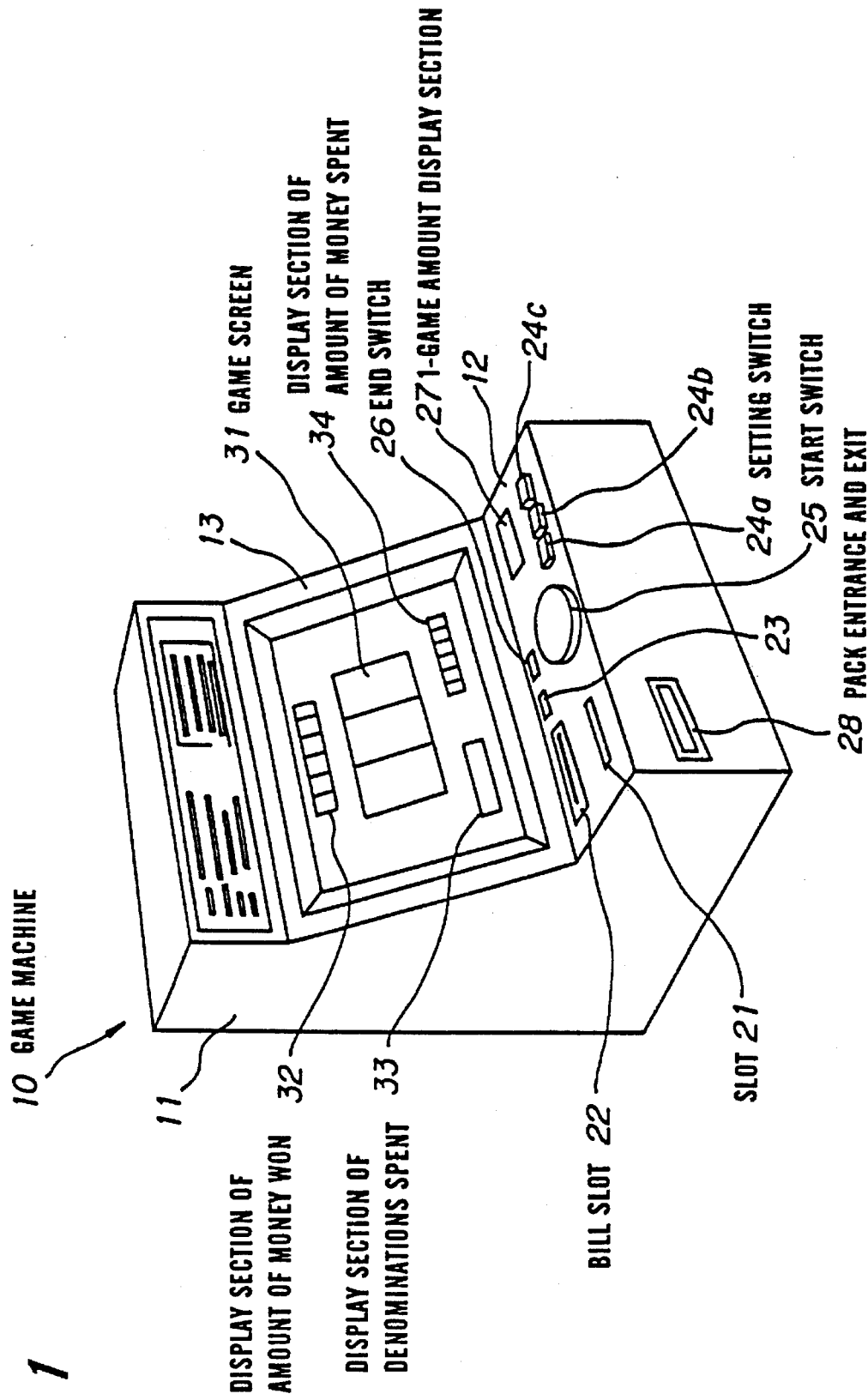
FIG. 1 is a perspective view showing a game machine according to a first embodiment of the invention.

FIGS. 1 to 20 show a first embodiment of the invention. FIG. 2 shows the functional configuration of a game parlor system of the invention. FIG. 1 shows an external view of a game machine according to the first embodiment of the invention.

The game machine 10 comprises a case 11, components secured to or installed on the case 11, and a control section 54 and a game execution section 59 installed in the case 11 for controlling game execution processing and processing various pieces of data.

The case 11 has on its front a base section 12 projected forward on the bottom and a slope section 13 on the top of the base section 12 so that the slope section 12 is continuous with the base section 13.

On the base section 12, the game machine 10 has a slot 21 for inserting credit media described below, a bill slot 22, a coin slot 23, three setting switches 24a, 24b, and 24c, a start switch 25, an end switch 26, and a 1-game amount display section 27.

The game machine 10 also has a pack entrance and exit 28 through which a packing device (described below) housing credit media is allowed to go in and out on the front face of the base section 12. The slope section 13 has a game screen 31, a display section 32 for displaying the amount of money won, a display section 33 for displaying the denominations spent, and a display section 34 for displaying the amount of money spent. The display sections comprise numeral displays, for example.

The game screen 31 is split into three areas, each of which forms a window sealed with a transparent substance. Three drums (not shown) on which digits, symbols, etc., are displayed are each disposed for each of the three areas within the game screen 31. The drums have mechanisms (not shown) for separately driving them for rotation. Therefore, digits and symbols are displayed by means of the drums separately in the three areas of the game screen 31. The game screen 31, the drums, and their rotation drive mechanism and drive control section constitute a game execution section 59.

In the embodiment, the game machine 10 is adapted to serve as a slot machine. That is, with the game machine 10, the drums are rotated to change digits, symbols, etc., viewed through three windows of the game screen 31 in sequence, and when all the drums stop, if a combination of the digits, symbols, etc., matches a specific preset combination, a "hit" is determined to occur and a win is given. The win can be given as a score, amount of money, or the like. A given number of game play media such as chips or medals can also be paid out for the win.

For the embodiment, a system is suitable in which actual game play media are not paid out and a medium on which the number of game play media is recorded is handed to a player for adjustment such as exchanging it for a prize based on the number recorded on the medium.

The display section for the amount of money won, 32, is adapted to digitally display the amount of money paid out to a player for winning plays. The display section of the denominations spent, 33, is adapted to indicate which of a credit medium 40, bills, or coins the amount of money spent on games is based on. The display section of the amount of money spent, 34, is adapted to digitally display the amount of money spent on games.

The credit medium 40 is a medium of card form issued by a credit medium issuing company based on the credit relation with a customer; it certifies that the person who owns the credit medium 40 has credit on transactions as deferred payment. The credit medium of this kind is a credit card, for example. In the embodiment, a player who carries the credit medium can insert it through the slot of the game machine for playing games without ready money.

The setting switches 24a, 24b, and 24c are switches for setting the amount of money to be spent for one game. The digits to be set may be the number of game play media, such as chips, rather than an amount of money. The setting switches may be reduced to one used to set the amount of money according to the number of times the switch is pressed. When the amount of money spent for one game is fixed., the setting switches may be omitted.

The start switch 25 is a switch for starting a game. This switch may be of handle lever type. The end switch 26 is a switch for ending a game.

The 1-game amount display section 27 is adapted to be responsive to operating of the setting switches 24a, 24b, 24c for displaying the amount of money or the number of game play media corresponding to the operated setting switches 24a, 24b, 24c.

The pack entrance and exit 28 is an entrance and exit for discharging a packing device 60 (described below) in which a credit medium 40 is sealed.

Figure 5:
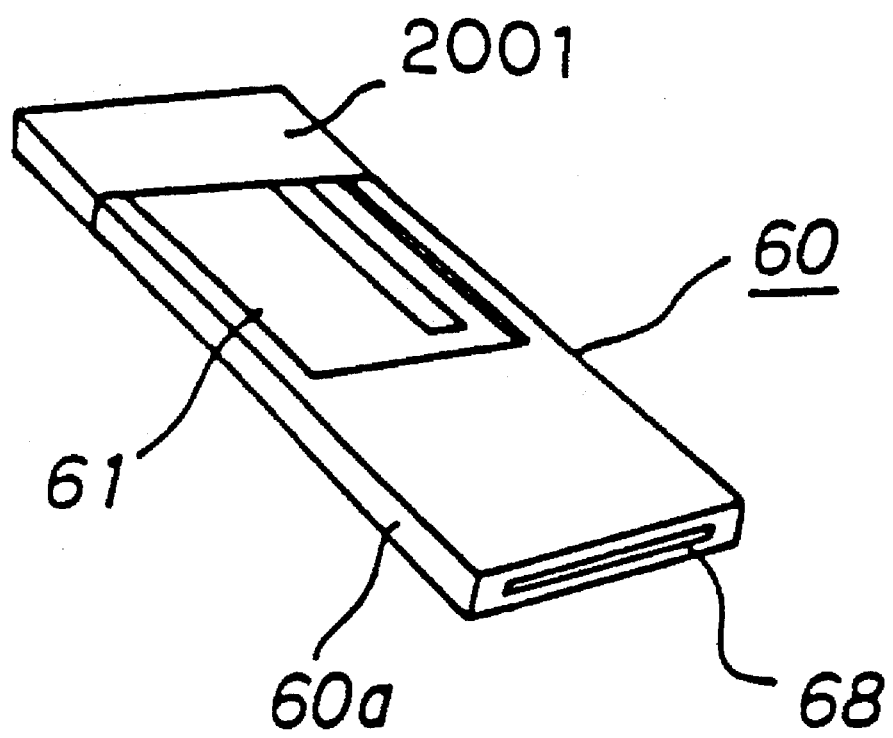
FIG. 5 is a perspective view showing a packing device according to the first embodiment of the invention.
Figure 6:
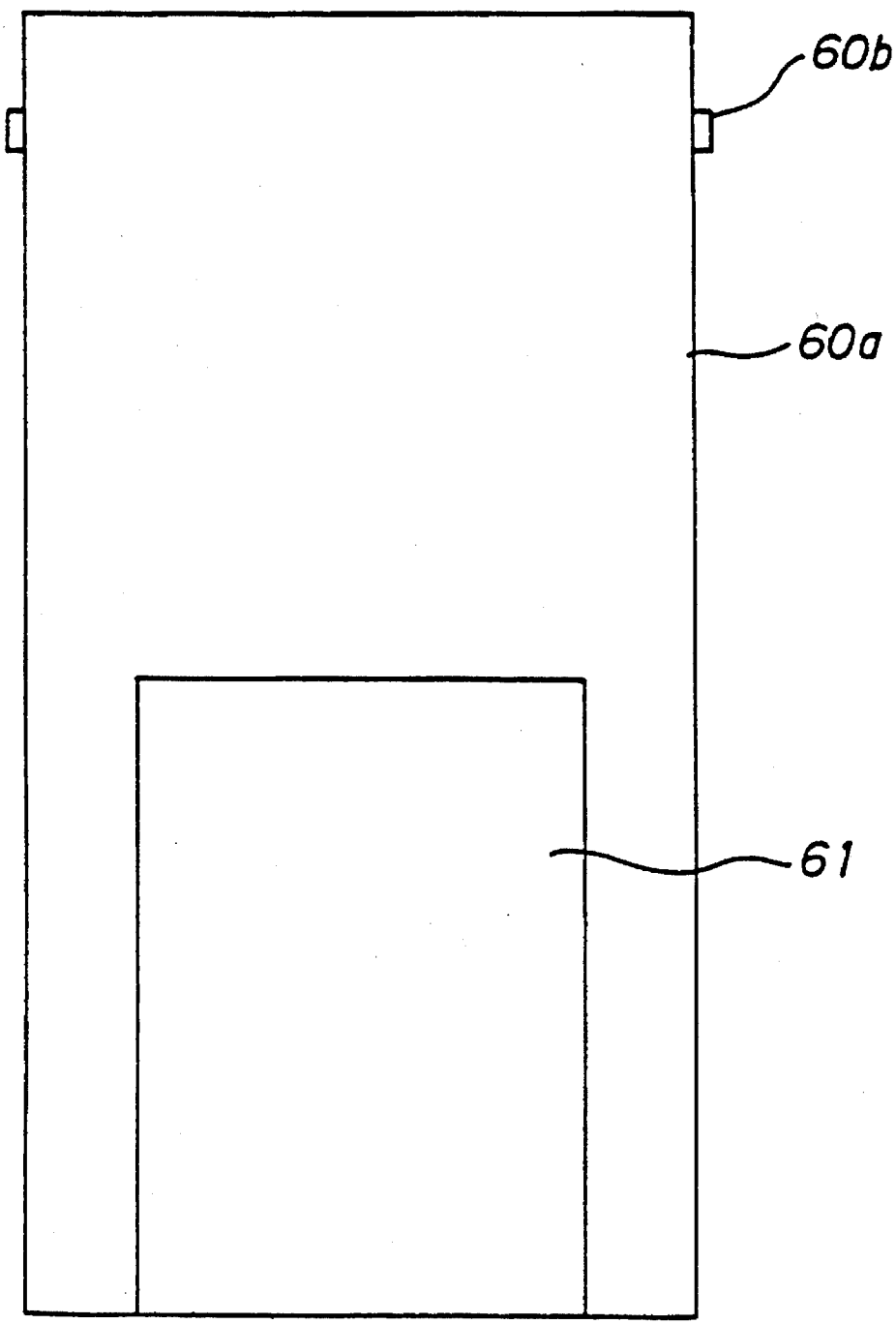
FIG. 6 is a front view showing the packing device according to the first embodiment of the invention.

The packing device 60 shown in FIGS. 5 and 6 has a structure for sealing a credit medium 40 therewithin. It comprises on the exterior an adjustment medium 61 onto which data can be written and pins 60b as shown in FIG. 6. The packing device 60 is described below in detail.

The adjustment medium 61 is made of a storage medium that can be written and read, such as a bar code or magnetic record or IC memory. In the embodiment, a magnetic record system is adopted. The game parlor name, date and time, security code, amount of money won, credit medium number, and amount of money spent with the credit medium are recorded on the adjustment medium 61.

Figure 3:
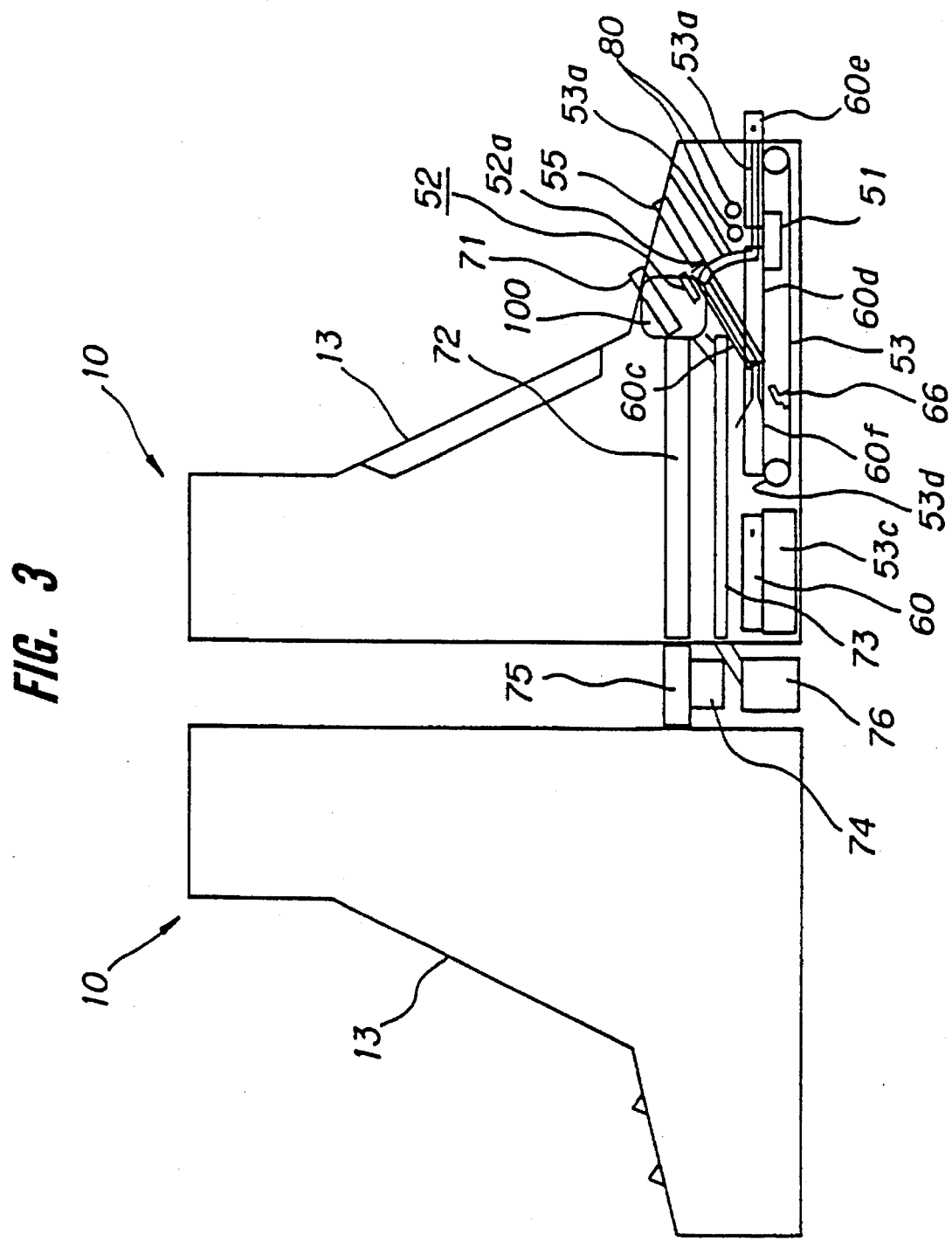
FIG. 3 is a schematic sectional view showing the internal structure of the game machine according to the first embodiment of the invention.

As shown in FIGS. 2 and 3, the game machine 10 contains a write section 51, a pack fixing section 52, a pack feed device 53, a control section 54, a read section 55 of credit medium 40, and a storage section 56.

The control section 54 and the storage section 56 are shown only in FIG. 2. The control section 54 contains at least one processor. The storage section 56 stores a processor operation program and various pieces of data. The control section 54 functions at least as a game processing section 57 and a data processing section 58. The game processing section 57 has a function to perform game processing in the range of the amount of money set in response to operating of the setting switches 24a, 24b, 24c. The data processing section 58 has a function to perform data processing based on the amount of money set in response to the setting switches 24a, 24b, 24c and the game processing result by the game processing section 57.

The write section 51 has a magnetic head, etc. The write section 51 is adapted to be responsive to operating the end switch for recording the data processing result by the data processing section 58 on the adjustment medium 61 of the packing device 60.

The read section 55 is adapted to read the record contents of a credit medium 40 inserted through the slot 21. The storage section 56 stores the record contents read by the read section 55.

The pack fixing section 52 serves as a mechanism to seal a credit medium 40 in the internal space of the packing device 60. That is, upon insertion of the credit medium, the pack fixing section 52 is provided to fix the packing device 60 set at the position indicated by reference numeral 60c in FIG. 3 and insert a rotation drive member 66 (described below in detail) in the packing device 60 in the state for rotating a gear 65 of the packing device 60 described below, thereby taking the credit medium 40 into the packing device 60. Installed below the pack fixing section 52 is a credit medium acknowledge sensor 52a for detecting introduction of the credit medium 40 fed through the slot 21 and the read section 55 into the packing device 60.

Since the packing device is formed with the adjustment medium in the embodiment, the pack feed device 53 serves as a discharge section of the pack device and adjustment medium 61. The pack feed device 53 has a conveyor for discharging the packing device 60 in which the credit medium 40 is sealed together with the adjustment medium 61 through the pack entrance and exit 28. That is, the packing device 60 unfixed from the pack fixing section 52 is guided by engagement of the pins 60b on both ends with a rail 53a. The packing device 60 is pushed by the pack feed device 53 and is brought down horizontally at the position indicated by reference numeral 60d in FIG. 3, then is further fed to the pack entrance and exit 28. The pack feed device 53 is provided with a conveyor claw 53d for pushing the packing device 60.

Figure 4:
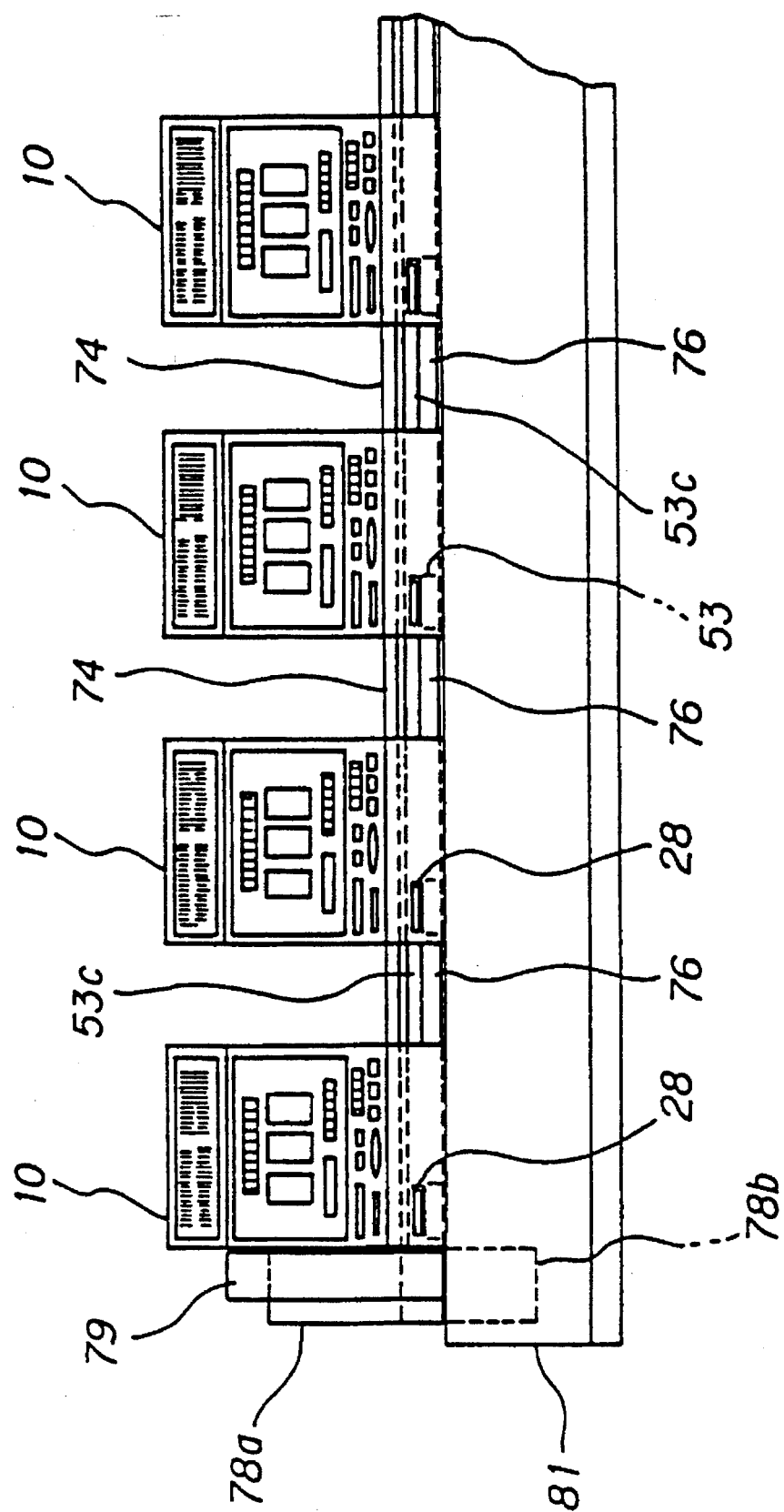
FIG. 4 is a front view showing how to install the game machines according to the first embodiment of the invention.

The pack feed device 53 is formed with a pack feed conveyor 53c on the rear. As shown in FIG. 4, the pack feed conveyor 53c pass through the game machines 10 arranged in the length direction of a game machine island 81 and is connected to a pack store magazine 79 installed at the island end from which the packing device 60 is sent out in a lateral direction.

A bill validator 71 and a first bill transporter 72 for operating bills are disposed in the game machine 10, as shown in FIG. 3. Also, a coil selector 100 and a first coin conveyor 73 for operating coins are disposed in the game machine 10. As shown in FIGS. 3 and 4, a plurality of the game machines 10 are installed back to back on the game machine island stand 81. A second bill transporter 74, a rotary feed section 75, and a second coin conveyor 76 are located between the game machines 10 placed back to back. A bill store box 78a, a coin store box 78b, and the pack store magazine 79 are disposed at the end of the game machine island stand 81.

A plurality of the packing devices 60 are stored in the pack store magazine 79. The packing devices 60 are carried one at a time on the pack feed conveyer 53c from the pack store magazine 79. The pack feed conveyor 53c is adapted to stop the packing device 60 at a predetermined position on the rear of the game machine 10. If the packing device 60 is not set in the game machine 10, the packing device 60 is moved from the pack feed conveyor 53c to the game machine 10. When the packing device 60 is moved to a predetermined position, it is placed on the pack feed device 53, then is pushed by the pack feed device 53 and guided by the rail 53a to the above-mentioned position indicated by reference numeral 60c, then is set at the position.

Next, one embodiment of the packing device, a component of the game parlor system according to the first embodiment will be described.

The packing device 60 has a case 60a, a holder 62, a shutter 63, a shutter cam 64, and a gear 65, as shown in FIGS. 5 to 15.

Figure 7:
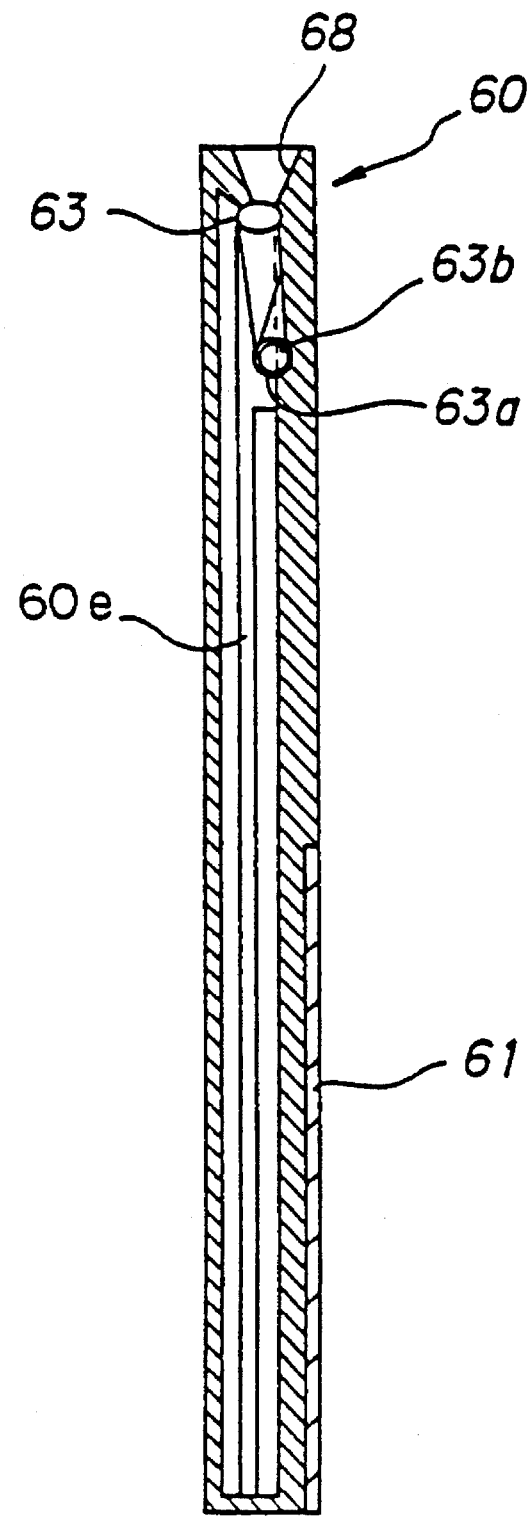
FIG. 7 is a sectional view showing the packing device according to the first embodiment of the invention.
Figure 8:
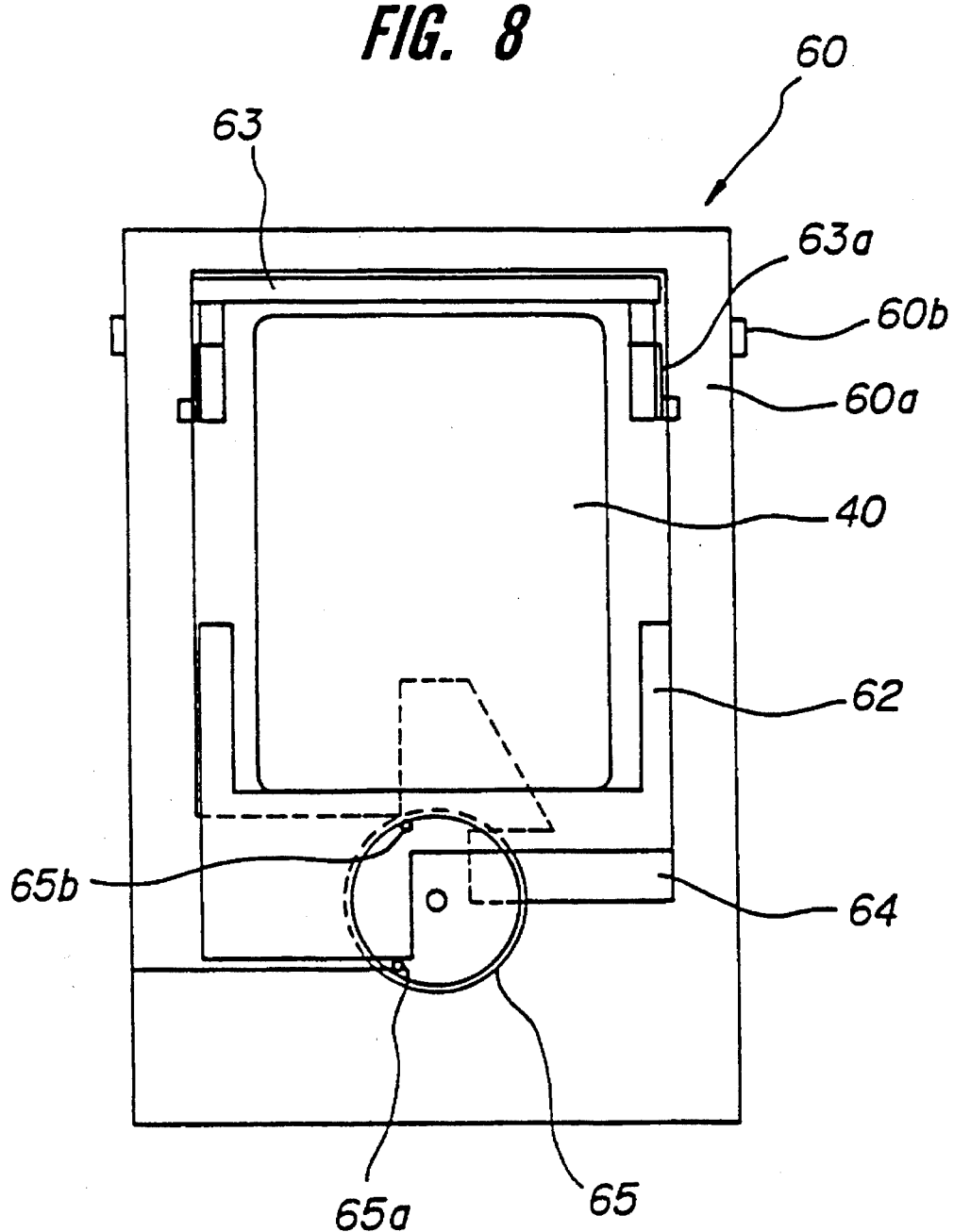
FIG. 8 is a front view showing the internal structure of the packing device in which a credit medium is housed according to the first embodiment of the invention.
Figure 9:
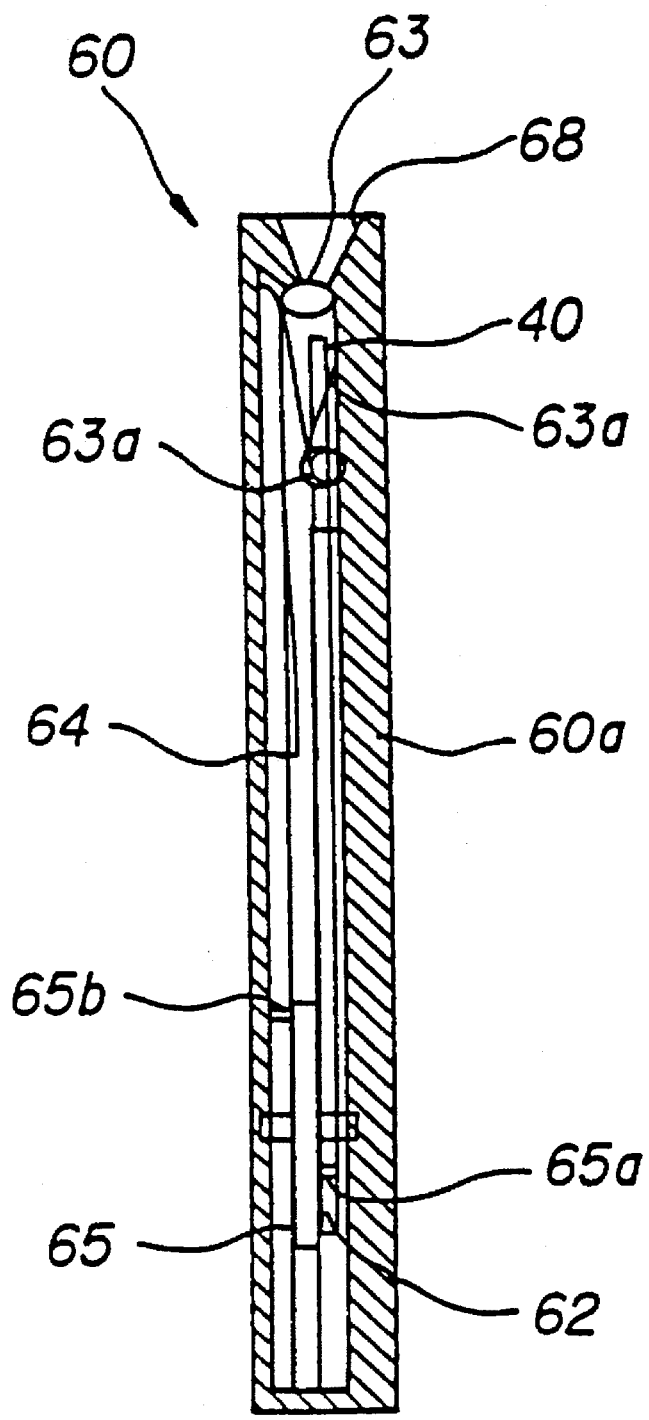
FIG. 9 is a sectional view showing the internal structure of the packing device in which a credit medium is housed according to the first embodiment of the invention.

The case 60a has a credit medium slot 68 for inserting a credit medium 40, as shown in FIGS. 5 and 7. For example, as shown in FIG. 7, the case 60a has an internal space 60e to house the credit medium 40 inserted through the credit medium slot 68. As shown in FIG. 8, pins 60b project outwardly from the case 60a. The holder 62 is housed movably back and forth within the case 60a. The holder 62 has a holding section 62a for holding the credit medium 40 and a cam section 62b formed like a step at the rear end, as shown in FIG. 10.

The packing device 60 has a device 2001, shown only in FIG. 5, for sending a signal for informing personnel in the game parlor that the packing device 60 has been taken out to the outside of a predetermined district. The signal sending device 2001 can be designed to send a specific radio wave, for example, as the taking-out informing signal.

The shutter 63, which is provided to open and close the credit medium slot 68, is disposed at the credit medium slot 68 in such a manner that it can be opened and closed. The shutter 63 is energized by means of a spring 63a in the direction of opening the credit medium slot 68.

Figure 11A:
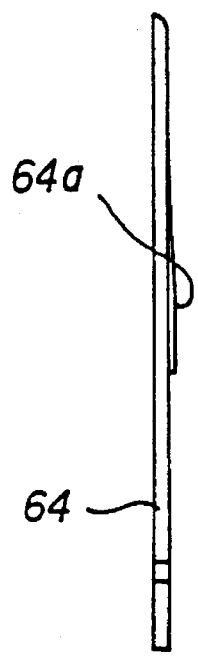
FIGS. 11a and 11b are a side view and a front view showing a shutter cam of the packing device according to the first embodiment of the invention.
Figure 11B:
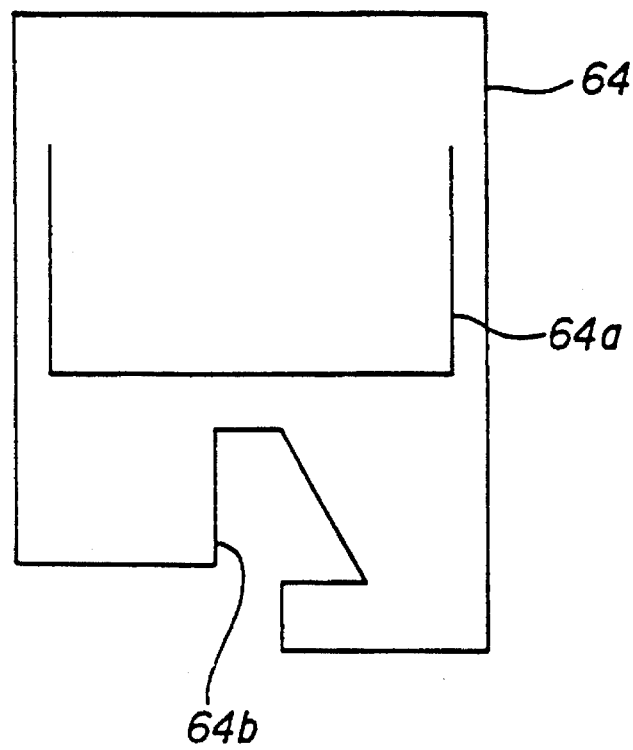

The shutter cam 64 is housed movably back and forth within the case 60a and has a structure for pushing out the shutter 63 in the direction of closing the credit medium slot 68 when it advances. As shown in FIG. 11A and 11B, the shutter cam 64 has a slope 64a in the plane section and a cam part 64b at the rear end.

Figure 12A:
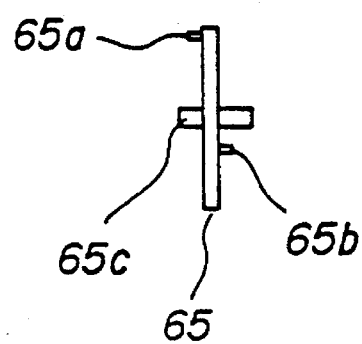
FIGS. 12a and 12b are a side view and a front view showing a gear of the packing device according to the first embodiment of the invention.
Figure 12B:
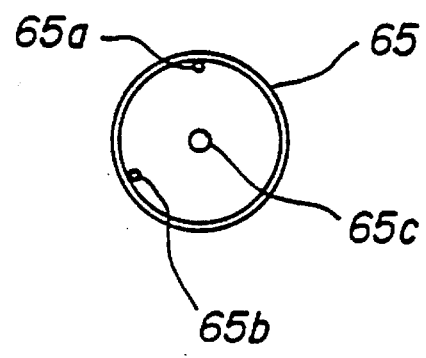
Figure 14:
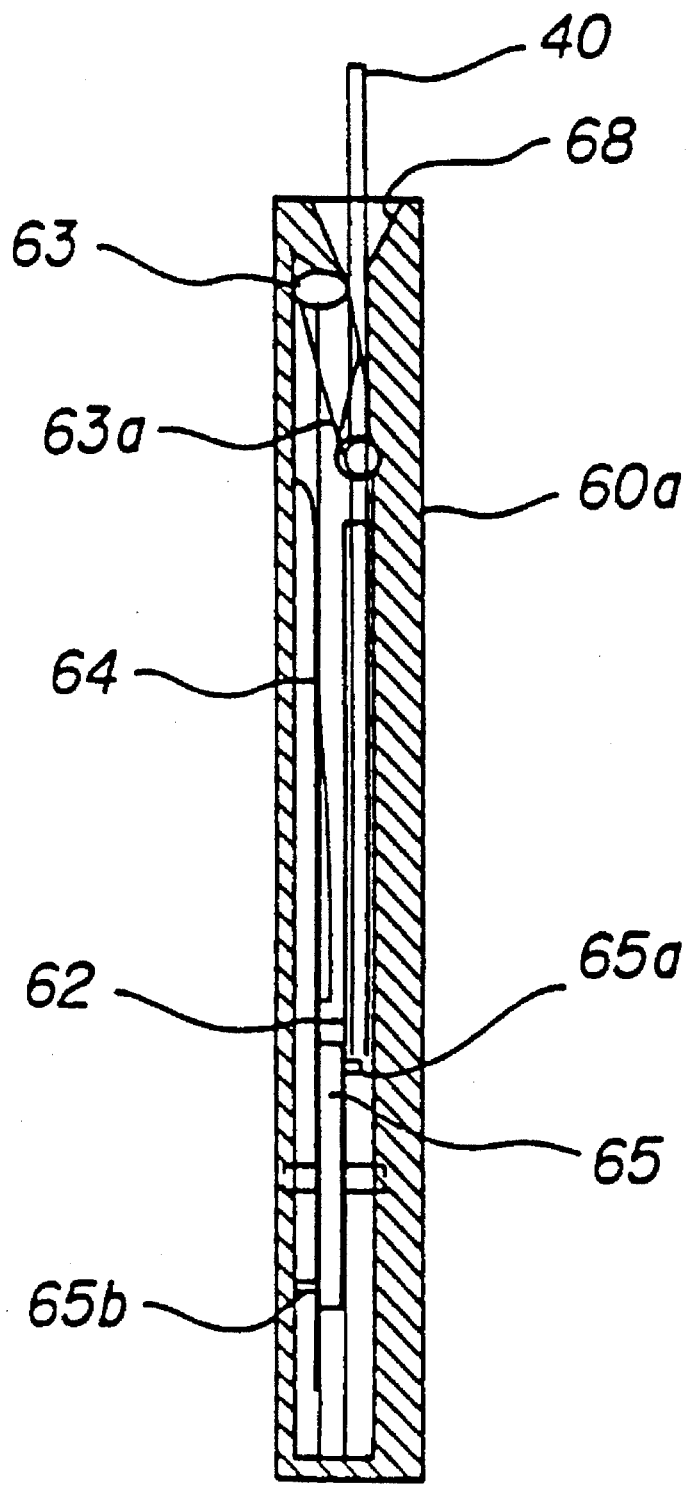
FIG. 14 is a sectional view showing the internal structure of the packing device in which a credit medium is pushed out according to the first embodiment of the invention.

The gear 65 has a first pin 65a engaged with the holder 62 and a second pin 65b engaged with the shutter cam 64 on opposite faces to each other, as shown in FIG. 12(A) and 12(B). The gear 65 is housed within the case 60a rotatably with the rotation shaft 65c as the center.

The gear 65 has a structure whereby when the first pin 65a moves as the holder 62 retreats, the second pin 65b moves in the direction of advancing the shutter cam 64 and when the first pin 65a moves in the direction of advancing the holder 62, the second pin 65b moves in the direction of retreating the shutter cam 64.

Figure 15:
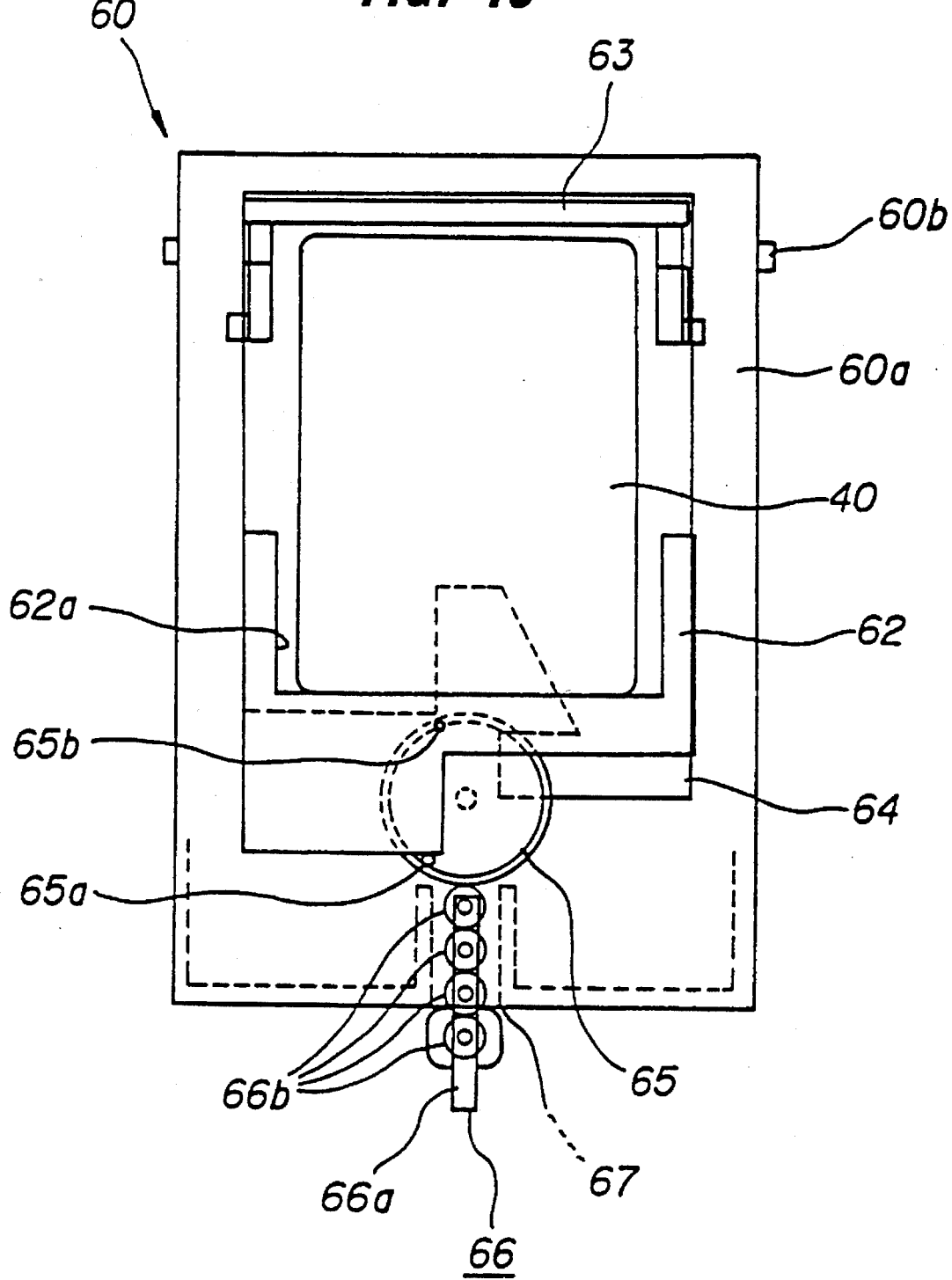
FIG. 15 is a front view showing the internal structure of the packing device at which a rotation drive member of a gear is inserted in an insertion hole according to the first embodiment of the invention.

The case 60a has an insertion hole 67 of a rotation drive member 66 of the gear 65, as shown in FIG. 15. The rotation drive member 66 comprises a bearing 66a and a plurality of gears 66b mounted pivotally on the bearing 66a and is a sequence of the gears 66b meshed with each other in order, as shown in FIG. 15. The rotation drive member 66 is located at a place where it can be inserted into the packing device 60 set at the position indicated by reference numeral 60c, as shown in FIG. 3.

Next, one example of the adjustment device 90, a component of the game parlor system according to the embodiment will be described.

Figure 16:
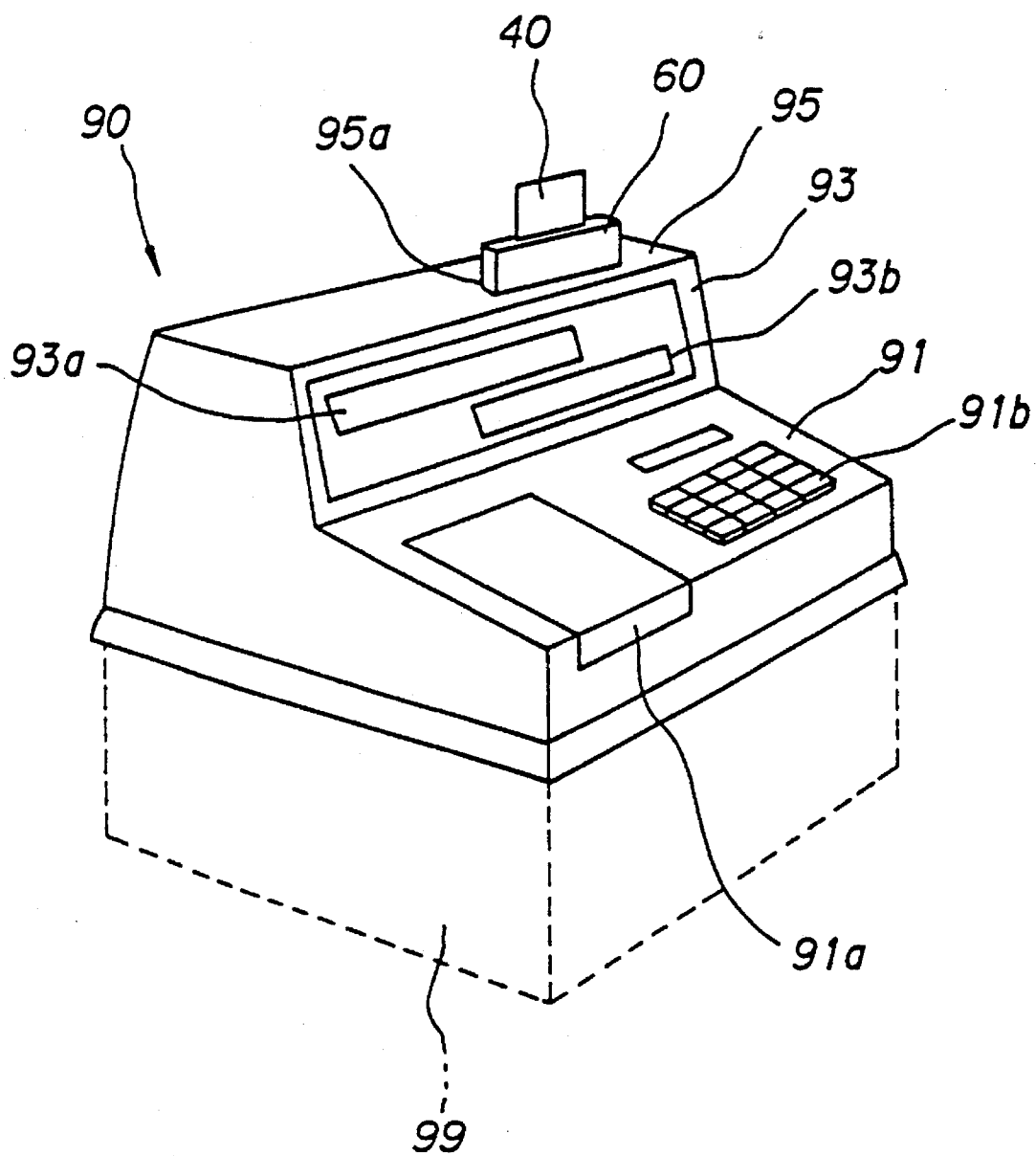
FIG. 16 is a perspective view of a slope section showing an adjustment device according to the first embodiment of the invention.

As shown in FIG. 16, the adjustment device 90 has a credit medium processing section (data processing section) 91a and an operator panel 91b on a base section 91, a display section 93a of data and the amount of money spent and a display section 93b of the amount of money won on the top front 93, and a slot 95a of a packing device 60 on the top 95.

Figure 18:
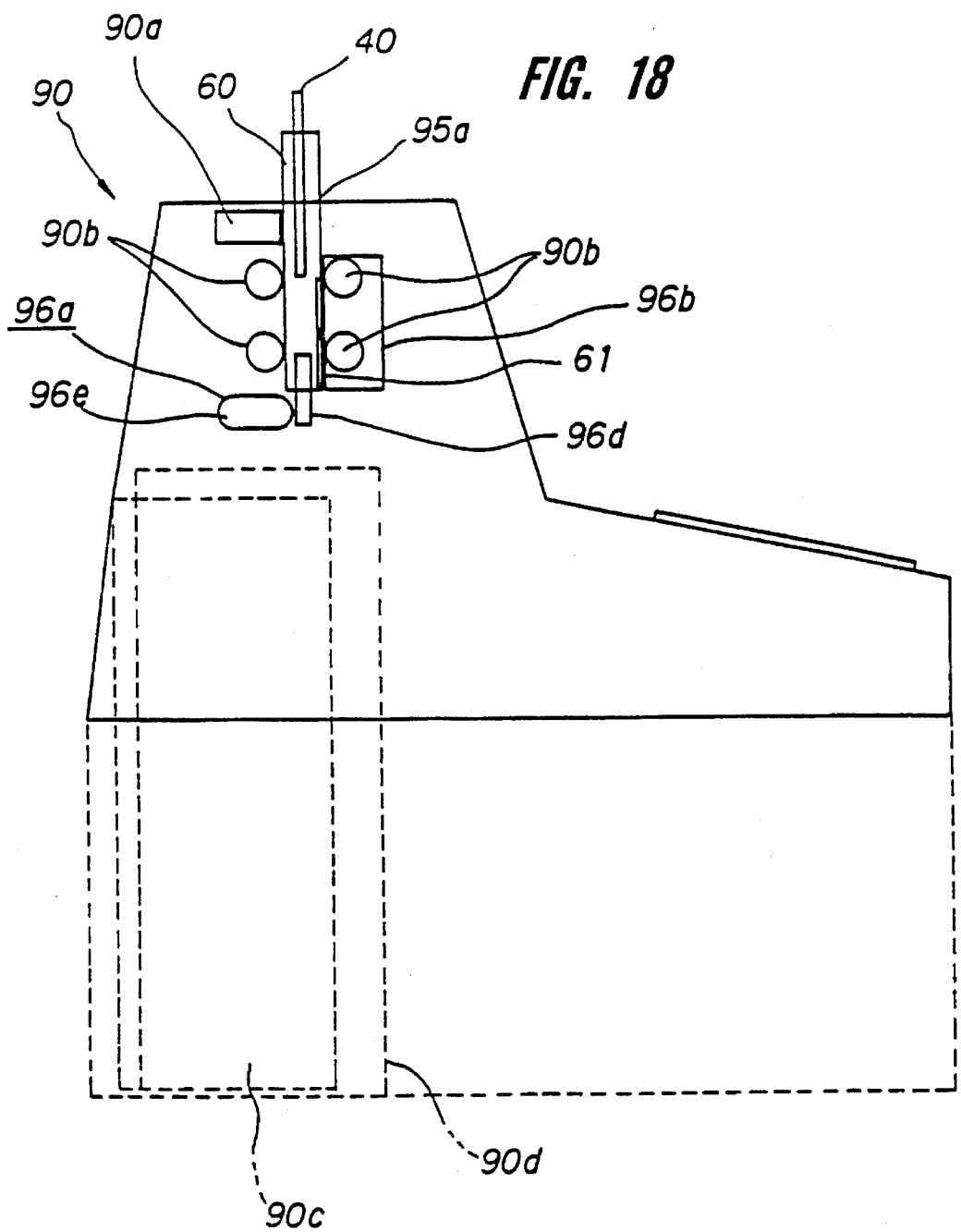
FIG. 18 is a sectional view showing an adjustment device according to the first embodiment of the invention.

As shown in FIGS. 2 and 18, the adjustment device 90 contains a credit medium extracting device 96a for taking the credit medium 40 out from the packing device 60 inserted in the slot 95a, a read section 96b of data recorded on the adjustment medium 61 of the packing device 60, a storage section 96f of data read by the read section 96b, a communication processing section 96g, and a cash dispensing control section 98.

Figure 17:
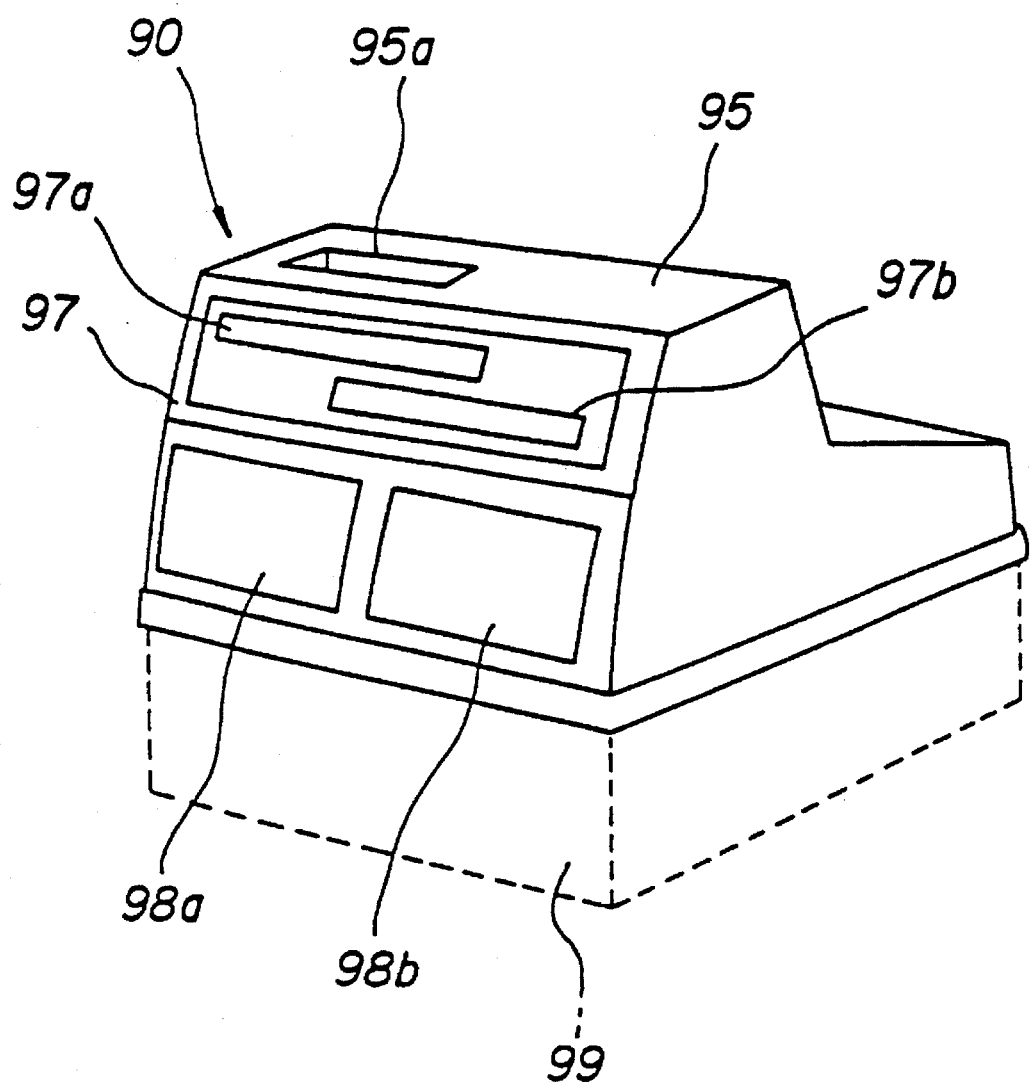
FIG. 17 is a perspective view of a rear section showing the adjustment device according to the first embodiment of the invention.

The credit medium extracting device 96a is made up of a gear driving gear 96d for rotating the gear 65 of the packing device 60 and a motor 96e. The structure of the gear driving gear 96d is similar to that of the rotation drive member 66. As shown in FIG. 17, the adjustment device 90 has a display section 97a of data and the amount of money spent and a display section 97b of the amount of money won on a rear section 97 and a coin outlet 98a and a bill outlet 98b in the lower section of the rear section 97. The adjustment device 90 has a slip and cash store section 99 at the bottom. The base section 91 is located facing personnel in the game parlor and the rear section 97 is located facing a player.

Dispensing coins and bills through the coin outlet 98a and the bill outlet 98b is controlled by the cash dispensing control section 98.

The adjustment device 90 contains a pack fixing device 90a, a pack guide roller 90b, a bill dispensing device 90c, and a coin dispensing device 90d.

Next, the operation of the entire game parlor system according to the embodiment will be described.

Figure 19:
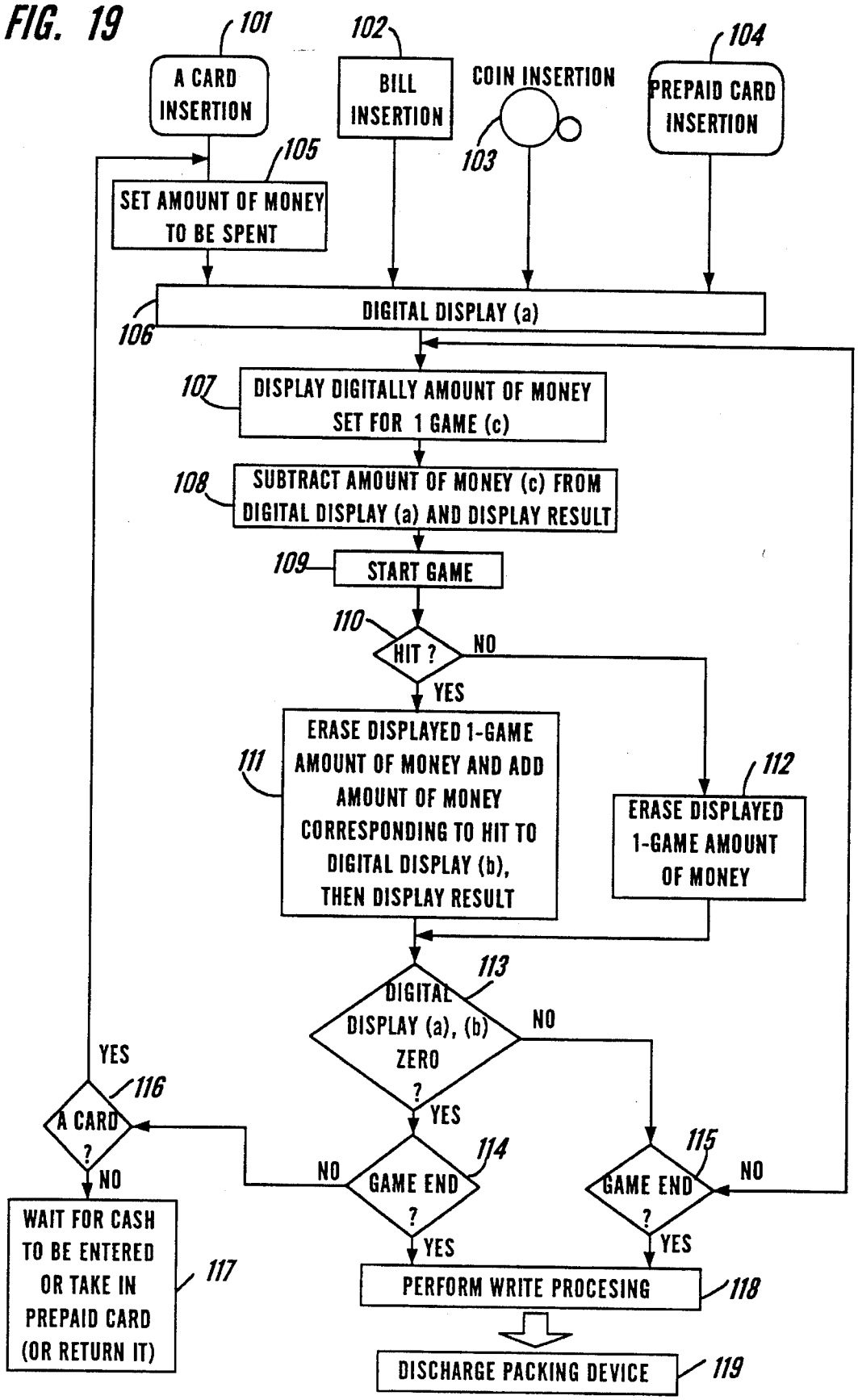
FIG. 19 is a flowchart showing processing of the game machine according to the first embodiment of the invention.
Figure 20:
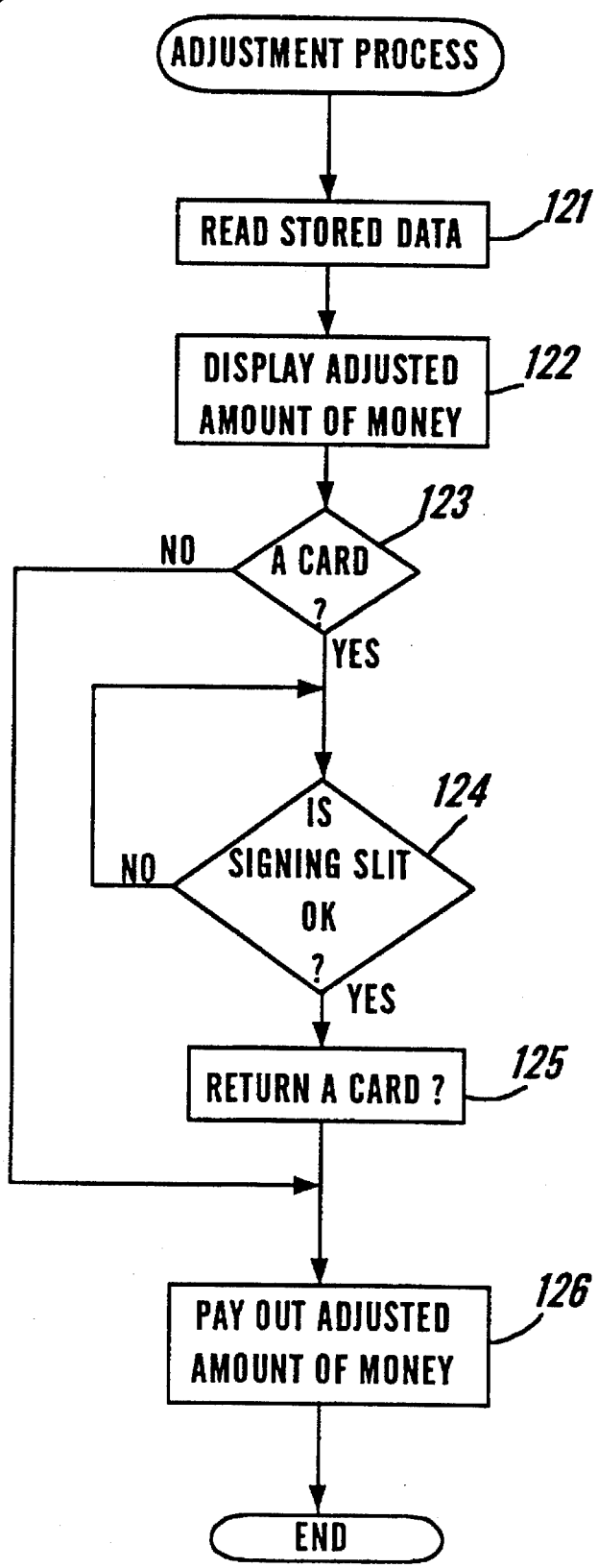
FIG. 20 is a flowchart showing processing with the packing device according to the first embodiment of the invention.

In FIGS. 19 and 20, the game machine in the embodiment enables a player to pay a charge for playing a game by using any of a credit medium 40, which represented as A card in FIGS. 19 and 20, bills, coins, and a prepaid card. To play a game at the game machine 10, the player needs to insert any of them into their respective slots of the game machine.

At the game machine 10, a check is made to see which of the credit medium 40, bills, coins, and prepaid card is inserted into their corresponding slots (steps 101–104).

If the credit medium 40 is inserted into the slot 21, the read section 55 reads the kind, number, and use time of the credit medium 40, the game machine number, and other necessary entries. These pieces of information are stored in the storage section 56, and further are transferred via the communication processing section 56a to the management computer 1000 which manages the entire game parlor, and are stored in a storage device (not shown) of the management computer 1000. If the read section 55 cannot read necessary data, the medium is determined to be a medium which can not be used by the game machine 10 and is discharged from the game machine.

In the embodiment, the management computer 1000 can be provided with validation means for determining whether or not a given credit medium is valid as an additional function. For example, information as a list of credit media whose validity is lost, namely, invalid credit medium information or the like sent from credit medium issuing companies is stored, and the validation means collates information concerning the credit medium 40 transferred from the game machine 10 with the invalid credit medium information stored. If the credit medium 40 inserted into the game machine 10 is one of the credit media listed as the invalid credit medium information, the validation means transfers a use prohibition command via communication means to the control section 54 of the game machine 10 sending the information concerning the credit medium 40.

When receiving the use prohibition command, the game machine 10 discharges the inserted credit medium 40 for rejecting use of the credit medium to play a game. At this time, an alarm may be given for enabling personnel in the game parlor to come to the game machine and check the problem credit medium.

The pack fixing section 52 seals the credit medium 40 inserted into the slot 21 in the packing device 60. The operation of the packing device 60, etc., is described below. When insertion is acknowledged by the credit medium acknowledge sensor 52a, the fact that the credit medium 40 is in use is indicated on the display section 33 of denominations spent, and the credit medium 40 remains held in the game machine 10 until the player ends the game.

When the player inserts the credit medium 40, for example, if insertion thereof is acknowledged by the credit medium acknowledge sensor 52a, the player may be prompted to set the amount of money to be spent by means of the setting switches 24a, 24b, 24c on display and/or in a voice.

The game machine 10 enables the player to use all denominations from large denomination bills to small denomination coins, and the amount of money entered is displayed on the display section 34 of the amount of money spent. If the minimum amount of money to play a game is 25 cents, the game machine 10 can accept two 10-cent coins plus one 5-cent coin or 25 1-cent coins as well as a 25-cent coin to play a game.

The player may use a large denomination bill for playing a game, in which case the player can receive the remaining amount of money at an adjustment office or counter after adjustment at an adjustment device. When using a large denomination bill, the player need not carry a large number of coins while playing games and can safely enjoy the games.

When the player sets the amount of money to be spent by using the setting switches 24a, 24b, 24c, the game processing section 57 of the control section 54 accepts it and finds the numeric value of the amount of money in response to the operated setting switches 24a, 24b, 24c (step 105).

The amount of money (a) is displayed digitally on the display section 34 of the amount of money spent (step 106). When the player enters the amount of money for one game by operating the setting switches 24a, 24b, 24c, the game processing section 57 of the control section 54 accepts it and the amount of money (c) is displayed digitally on the 1-game amount display section 27 (step 107). The game processing section 57 subtracts the amount of money (c) displayed on the 1-game amount display section 27 from the amount of money (a) displayed on the display section 34 of the amount of money spent, and displays the resultant amount on the display section 34 of the amount of money spent (step 108), then instructs a game to be started (step 109). The game processing section 57 monitors progress of the game and also checks to see if a "hit" occurs (step 110).

When one game ends and no "hit" occurs, namely, when the player losts the game, the data processing section 58 erases the amount of money (c) displayed on the 1-game amount display section 27 (step 112). On the other hand, if a "hit" occurs, namely, if the play wins the game, the data processing section 58 erases the amount of money (c) displayed on the 1-game amount display section 27, and adds the amount of money won to the amount of money won so far, then displays the result on the display section 32 of the amount of money won as a new amount of money won (b) (step 111).

The data processing section 58 checks the 1-game amount display section 27 for the amount of money (a) and the display section 32 of the amount of money won for the amount of money won (b) (step 113). Further, if both of the amounts of money are 0 or if either of them is not 0, the data processing section 58 checks whether or not the game end switch 26 is pressed (steps 114, 115). When either of the amounts is not 0 and the game end switch 26 is not pressed, control returns to step 107.

The 1-game amount display section 27 is checked for the amount of money (a) and the display section 32 of the amount of money won is checked for the amount of money won (b) to enable the player to continue games automatically by using the amount of money displayed on the display section 32 of the amount of money won if the amount of money displayed on the display section 34 of the amount of money spent reaches zero.

That is, so long as the player loses games, the amount of money displayed on the display section 34 of the amount of money spent continues to be decremented; if the player wins a game, the amount of money won is added and the result is displayed on the display section 32 of the amount of money won. Therefore, the player can continue games so long as he or she wins games.

The amount of money on the display section 32 of the amount of money won may be used in preference to the amount of money on the display section 34 of the amount of money spent. The display section 32 of the amount of money won and the display section 34 of the amount of money spent may be integrated for adding the amount of money won and the amount of money spent for the player to play games.

When the amount of money on the display section 34 of the amount of money spent reaches zero and the game end switch 26 is not pressed, a determination is made as to whether or not credit medium 40 is used (step 116). If the credit medium 40 is used, when the player again enters the amount of money to be spent, the amount of money is displayed on the display section 34 of the amount of money spent to enable the player to continue games (step 105). On the other hand, if the credit medium 40 is not used, the game machine waits for the player to enter cash or takes in the prepaid card and makes it unavailable or returns the prepaid card (step 117).

When the end switch 26 is determined to be pressed at steps 114 and 115, the write section 51 records the result of data processing performed by the data processing section 58 on the adjustment medium 61 of the packing device 60 in response to operating the end switch 26 (step 118). The pack feed device 53 discharges the packing device 60 sealing the credit medium 40 (step 119). Since the packing device 60 has the adjustment medium 61 on which data is recorded by the write section 51, the adjustment medium 61 is also discharged at the same time.

If the player uses bills or coins rather than the credit medium 40, data is written onto the adjustment medium 61 with no credit medium 40 sealed in the packing device 60 and the packing device 60 is discharged. The adjustment medium 61 of the packing device 60 can be used for adjustment processing.

If the player moves to another game machine 10 in the state, he or she may insert the packing device 60 into the pack entrance and exit 28 of the game machine 10. The player need not go to the adjustment office or counter each time he or she changes the game machines 10. The amount of money paid out so far to the player from the game machine for winning plays is displayed on the display section 32 of the amount of money won and the display section 34 of the amount of money spent of a new selected game machine 10 to enable the player to start new games. In this case, even if the display section 34 of the amount of money spent indicates zero during the game, the player can repeat a new game any number of times by again entering the amount of money to be spent by himself or herself. Of data recorded on the adjustment medium 61 of the packing device 60, data such as the credit medium number is sent to the computer and record is again started and added.

For adjustment, the player brings the discharged packing device 60 with the adjustment medium 61 to the adjustment office or counter and inserts the packing device 60 into the slot 95a of the adjustment device 90 for adjustment based on the data recorded on the adjustment medium 61.

The adjustment device 90 reads the recorded data from the adjustment medium 61 of the inserted packing device 60 (step 121) and calculates the adjusted amount of money based on the recorded data, then displays the resultant amount of money to be paid out on the display section 93b of the amount of money won (step 122).

A determination is made as to whether or not credit medium 40 is sealed in the packing device 60 (step 123). If no credit medium 40 is sealed, when the player has won more games than lost games, the adjustment device 90 dispenses bills and/or coins of denominations corresponding to the amount of money to be finally paid out to the player through the bill outlet 98b and the coin outlet 98a (step 126).

In this case, the adjusted amount of money may be exchanged for a prize rather than cash. A note, coupon, or the like may also be paid out to the player.

If the credit medium 40 is used, the player signs a slip and transfers it to personnel in the game parlor. In this case, personnel press an acknowledge switch (not shown) installed on the adjustment device 90. The adjustment device 90 checks to see if the acknowledge switch is pressed, and when the switch is pressed, removes the credit medium 40 from the packing device 60 and discharges them (steps 124 and 125). Then, the adjustment device 90 pays out the adjusted amount of money to the player (step 126).

The adjustment device 90 transfers the adjustment result to the management computer 1000 as data for managing sales, etc. Further, if the credit medium 40 is used, the adjustment device 90 also transfers data such as the credit medium number recorded on the adjustment medium 61. Then, the management computer 1000 can also use the data, for example, to issue a bill to the credit medium issuing company or its representative, a financial institution for receiving deferred payment. The credit medium issuing company or its representative financial institution charges the bill directly to the bank account specified by the player, thereby completing the payment.

Therefore, the player can make adjustment in deferred payment. Thus, if the player does not have ready money, they can still enjoy a game suited to their convenience. The player who wants to continue playing games is allowed to do so, even if the player spends all his or her ready money, for the game parlor to make a profit.

The packing device 60, which is formed with the adjustment medium 61 on the slope section, can prevent the player from forgetting to carry the adjustment medium 61 to the adjustment office or counter when adjustment is made.

With the adjustment device 90, if the packing device 60 in which the credit medium 40 is sealed is inserted into the credit medium slot 95a, the credit medium 40 can be taken out from the packing device 60 by the credit medium taking-out device 96a. Personnel in the game parlor pays out cash to the player by operating the operator panel 91b of the adjustment device 90. The data recorded on the adjustment medium 61 of the packing device 60 is read by the read section 96b, and is stored in the storage section of the adjustment device 90.

At the end of a game, the player must make adjustment at the adjustment office or counter regardless of whether or not he or she has won a game because the credit medium 40 is sealed in the packing device 60. Therefore, the packing device 60 in which the credit medium 40 is sealed can be managed to prevent the player from running away without adjustment.

Particularly, the packing device 60 is provided with, for example, a device 2001 for sending a specific radio wave, as shown in FIG. 5, and upon reception of the radio wave, personnel in the game parlor can be informed that the packing device 60 has been taken out to the outside of a predetermined district. Therefore, the device 2001 can prevent the player from running away with the packing device 60 before adjustment. The device 2001 may be disposed in the packing device 60.

FIG. 23 shows an example in which an access monitor system 2000 is located at the entrance and exit of a game parlor. The access monitor system 2000 is located at each entrance and exit of the game parlor. For simplicity, the example game parlor in FIG. 23 has one entrance and exit.

The access monitor system 2000 comprises a gate structure 2010 having doors 2030 that can be automatically locked, detectors 2020 for receiving a radio wave emitted from a device 2001 mounted on a packing device 60 for detecting taking-out of the packing device, controllers 2040 which, upon detection of taking-out of the packing device 60, are responsive to a detection signal thereof for locking the doors 2030 in the closed state, and an alarm 2050 which gives an alarm upon reception of the detection signal.

The alarm can be given by sound and flashing light, for example.

With the access monitor system 2000, even if a player attempts to take out the packing device 60 to the outside of the game parlor, it is detected by the detector 2020 at the gate structure 2010 and the doors are closed, thereby preventing the player from running away with the packing device 60.

Only the alarm may be given without closing the doors.

Next, the operation of the packing device 60 will be described in detail.

First, before a game is started, the packing devices 60 are transported one at a time to the position in each game machine 10 indicated by reference numeral 60f in FIG. 3 by the operation of the pack feed conveyor 53c described above. Next, the packing device 60 is transported from the position indicated by reference numeral 60f in FIG. 3 to the position indicated by reference numeral 60c by the above-mentioned operation of the pack feed device 53. At the position indicated by reference numeral 60c, the packing device 60 is fixed by the pack fixing device 52 and stands by with the rotation drive member 66 inserted through the insertion hole 67 and the gear 66b meshed with the gear 65. At this time, the shutter 63 opens by the operation of the spring 63a.

When a player inserts a credit medium 40 through the slot 21 of the credit medium reader 55 of the game machine 10, information recorded on the credit medium 40 is read by the reader 55, then the credit medium 40 is fed into the packing device 60. When the credit medium acknowledge sensor 52a detects introduction of the credit medium 40 into the packing device 60, the gears 66b of the rotation drive member 66 are driven for rotating the gear 65 in the packing device 60 for moving the holder 62 of the first pin 65a described above, thereby taking the credit medium 40 into the packing device 60 completely. Further the gear 65 rotates, thereby causing the shutter cam 64 to push the shutter 63 for closing the shutter 63. In the state, a game is started.

At the end of the game, when the player presses the game end switch 26, the pack fixing device 52 and the rotation drive member 66 are removed and the pack feed device 53 operates so that the packing device 60 moves along the rail 53a, is brought down horizontally from the state in which the packing device 60 faces diagonally upward, and is transported to the position indicated by reference numeral 60e in FIG. 3. During the transportation, the packing device 60 is made to closely adhere to the write section 51 by means of rollers 80 shown in FIG. 3, and various pieces of data are entered on the adjustment medium 61 by the write section 51. The player takes hold of the packing device 60 appearing at the position 60e to the adjustment office or counter, at which the packing device 60 is processed by means of the adjustment device 90 as described above.

To take out the credit medium 40 from within the packing device 60 at the adjustment device 90, the gear driving gear 96d is inserted into the insertion hole 67 and the gear 65 is rotated. In response to rotation of the gear 65, the first pin 65a causes the holder 62 to advance and the second pin 65b causes the shutter cam 64 to retreat. When the shutter cam 64 retreats, the shutter 63 is responsive to energy for opening the credit medium slot 68. Thus, the credit medium 40, in contrast to insertion thereof, is fed to the position where the tip of the credit medium 40 projects from the credit medium slot 68, and can be taken out from within the case 60a.

Figure 21:
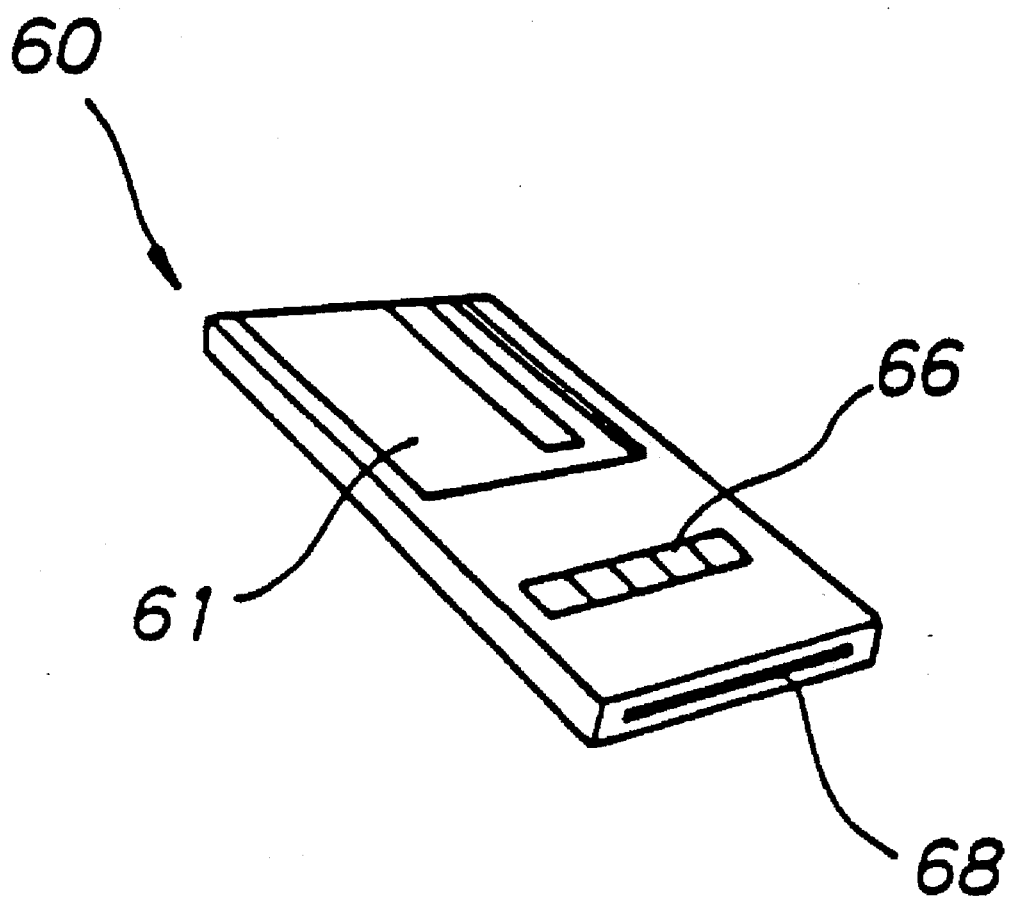
FIG. 21 is a perspective view showing another form of the packing device of the invention.

FIG. 21 shows another form of the packing device 60 of the invention.

In the form, the packing device 60 has a display section 66 for indicating the amount of money based on the game processing result on the surface of an adjustment medium 61. Parts identical with or similar to those in the first embodiment are denoted by the same reference numerals and will not be discussed again.

The packing device 60 has the display section 66 in the slope section as mentioned above, and therefore can display the amount of money based on the game processing result on the display section to give a sense of security to the player.

Figure 22:
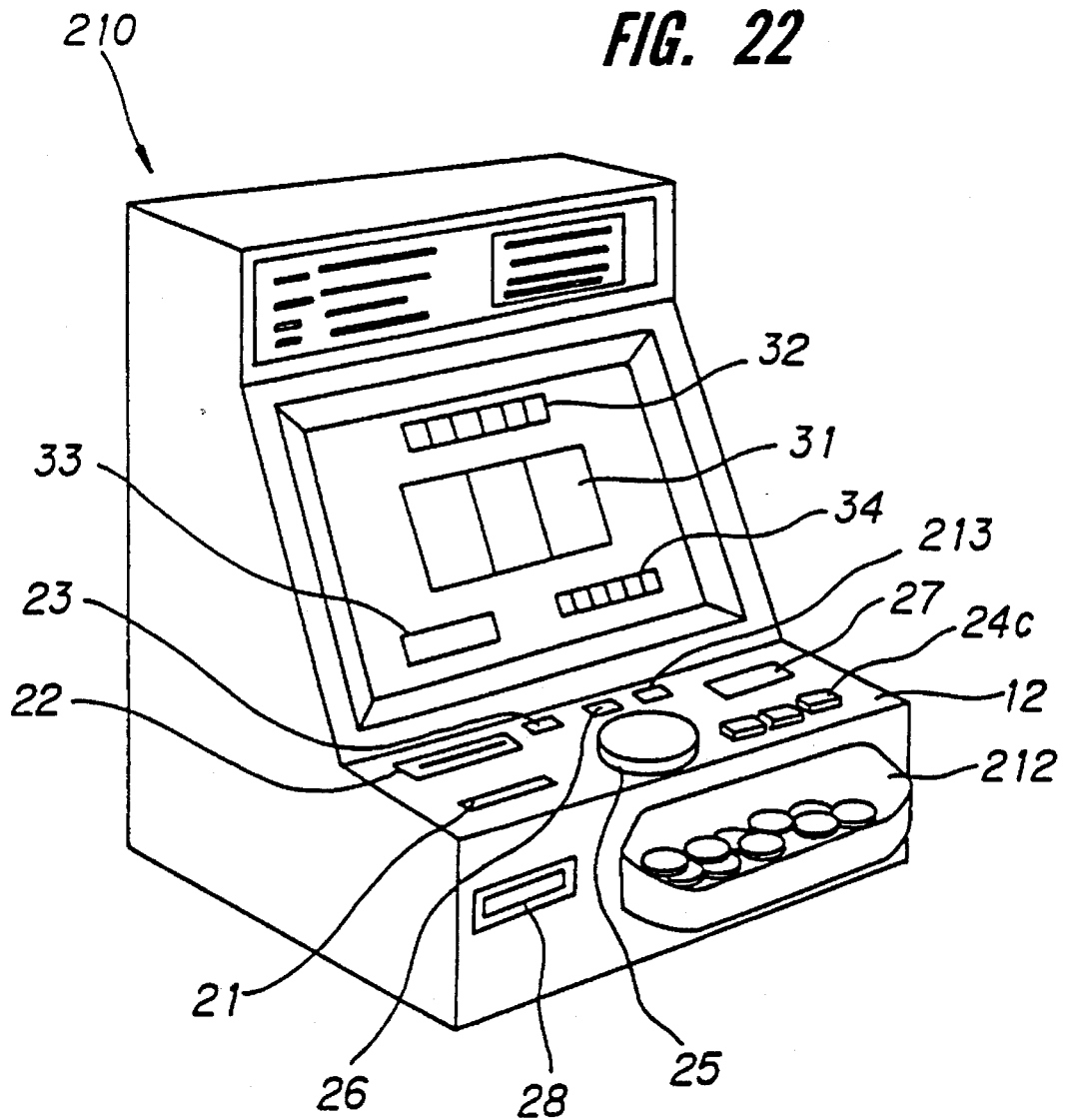
FIG. 22 is a perspective view showing a game machine according to a second embodiment of the invention.

FIG. 22 shows a game machine according to a second embodiment of the invention.

Game play media such as medals are not used in the first embodiment, but can be operated in the second embodiment. Parts identical with or similar to those in the first embodiment are denoted by the same reference numerals in the second embodiment and will not be discussed again.

The game machine 210, for which coins can be used as game play media, comprises a game play medium store and dispensing section 212 communicating with a coin slot 23 and a coin dispensing selection switch 213 as well as components similar to those in the first embodiment. A control section 54 of the game machine 210 has a dispensing control section (not shown). When a player operates the coin dispensing selection switch 213, the dispensing control section is adapted to cause the dispensing section 212 to discharge coins based on the game processing result of a game processing section 57.

Next, the operation will be described.

A player can also enter coins in the slot 23 to play a game based on the amount of money corresponding to the number of entered coins. The data processing section 58 performs data processing based on the amount of money corresponding to the number of coins entered in the slot 23 and the amount of money set in response to operating setting switches 24a, 24b, 24c.

When the coin dispensing switch 213 is operated, coins of the same amount as used for one game are discharged from the dispensing section 212, by the dispensing control section before the amount of money won, is displayed on a display section 32 of the amount of money won based on the game processing result of the game processing section 57. If the dispensing section 212 becomes full, an overflow sense switch (not shown) operates for stopping dispensing through the coin dispensing section 212 and displaying the remaining amount of money on the display section 32 of the amount of money won. The player can enter the dispensed coins in the slot 23 to reuse them for playing games in addition to the amount of money on the display section 32 of the amount of money won. The player may operate a dispensing method selection switch for automatically adding the dispensed coins to the amount of money on the display section 32 of the amount of money won instead of entering the dispensed coins in the slot 23.

The player may enter discharged game play media in the slot or make adjustment for the media at the adjustment office or counter together with a packing device 60. If coins are bulky, they may be exchanged for bills.

By actually operating game play media, the player can enjoy the physical sensation of the game play media themselves and the sound produced when operating them, together with a game when playing the game. Therefore, a greater sense of reality can be generated.

Balls rather than coins may be used as game play media. Metal balls and other spheres can be used as the balls. The material, size, and colors of the balls may be as desired, but ceramic balls of various colors containing gold are preferred.

To use balls and play games with balls in the dispensing section 212, the balls in the dispensing section 212 may be automatically taken into the game machine 210 by operating a ball taking-in lever attached around the dispensing section 212.

When the balls are taken in, the number of the balls may be counted and displayed on the display section 32 of the amount of money won, in which case a player can continue playing games by operating the ball taking-in lever.

Balls in the dispensing section 212 may be gathered in a box for collection or may be exchanged for cash at the adjustment office or counter. If the player presses a game end switch at the end of a game, balls in the dispensing section 212 may be automatically taken into the game machine 210 and the amount of money corresponding to the taken-in balls may be displayed on the display section 32 of the amount of money won. After the amount of money is recorded on the adjustment medium 61 of a packing device 60 at the next step, the packing device may be discharged.

In addition to the above-mentioned structure, the packing device may be adapted to be opened only with a special key and may be opened at the adjustment office or counter for taking out a credit medium 40 to be returned to the player.

In addition to providing the packing device 60 with the adjustment medium 61, the adjustment medium 61 together with the credit medium 40 may be housed in the packing device 60.

To prevent a player from taking out the packing device 60, a sound generator may be disposed in the packing device 60, rather than providing the packing device with a device for sending a signal, for playing music when the packing device 60 is not set in the game machine 10 or in the adjustment device 90.

According to the game machines, adjustment devices, and packing devices constituting the game parlor system of the invention described above, players can use credit media to play games. In this case, the credit medium is sealed in the packing device. Data on winning and losing plays is recorded on the adjustment medium mounted on the packing device. Thus, after ending games, the player brings the packing device to the adjustment office or counter at which adjustment is made by the adjustment device based on the data recorded on the adjustment medium.

If the player must pay a charge in adjustment, he or she can make deferred payment based on credit given from his or her credit medium. Thus, if the player does not have ready money, he or she can play a game suited to his or her convenience. The player who wants to continue playing games is allowed to do so, even if the player spends all his or her ready money, so that the game parlor makes a profit.

The packing device has a simple structure to facilitate housing and taking out the credit medium in and from the case.

The packing device, if it is provided with the adjustment medium where data can be read and written, can prevent the player from forgetting to carry the adjustment medium to the adjustment office or counter when adjustment is made.

If the packing device has the display section, it can also be used for adjustment because the amount of money based on the game processing result can be displayed on the display section.

If the packing device has the signal sending device, personnel in the game parlor can be informed that the packing device has been taken out to the outside of a predetermined district, thereby preventing the player from running away with the packing device before adjustment.

Although the data recorded on the credit medium is read at the game machine in the embodiment, the invention is not so limited. For example, the credit medium may be only sealed in the packing device at the game machine and the data may be read by the adjustment device.

We claim:

1. A game parlor system comprising at least a plurality of game machines each having a game execution section and one or more adjustment devices for adjustment based on the game play result at each of the game machines, wherein the improvement comprises:

a plurality of packing devices each for sealing a credit medium on which data certifying that credit is given is recorded; and a plurality of adjustment media for recording data containing the game result after a game is played, each of said game machines comprising:
a case having a slot for inserting the credit medium;
a switch for setting an amount of money to be spent for a game and a game end switch, said switches being installed on said case;
a mechanism for sealing the credit medium in said packing device;
a control section responsive to operating said setting switch for processing so that a game is played in the range of the setup amount of money and for processing data occurring as the game is played;
a write section responsive to operating of said end switch for recording the result of data processing performed by said control section on said adjustment medium; and
a section for discharging said packing device in which the credit medium is sealed and said adjustment medium on which data is recorded by said write section, said adjustment device comprising:
a case having a slot for the adjustment medium and the packing device sealing the credit medium;
a section for taking out the credit medium from said packing device inserted in the slot,
a read section for reading data recorded on said adjustment medium; and
a data processing section for performing adjustment processing based on the data read by said adjustment medium read section.

2. The game parlor system as claimed in claim 1 wherein each of said game machines further includes a credit medium read section for reading data recorded on the credit medium inside said slot.

3. The game parlor system as claimed in claim 1 wherein said write section further writes at least a part of data read by said credit medium read section onto said adjustment medium.

4. The game parlor system as claimed in claim 3 wherein said adjustment medium is disposed on said packing device.

5. The game parlor system as claimed in claim 4 wherein said game machine accepts at least one of a bill, a coin, and a prepaid card for use and wherein said discharge section discharges an empty packing device containing no credit medium.

6. The game parlor system as claimed in claim 1 wherein each of said packing devices further includes a device for sending a signal for detecting taking-out of said packing device to the outside of the game parlor.

7. The game parlor system as claimed in claim 6 further including a detector for detecting the signal sent by said signal sending device and sensing taking-out of said packing device.

8. The game parlor system as claimed in claim 7 further including an alarm which, when said detector detects taking-out of said packing device, receives a detection signal thereof and issues an alarm.

9. The game parlor system as claimed in claim 1 wherein at least some of said game machines further include a game execution section for executing a game when a game play medium is loaded, a store section which stores the game play medium and has an inlet for loading the game play medium into said game execution section, and a dispensing control section being responsive to the game result at said game execution section for dispensing game play media through said store section for winning plays.

10. A game machine comprising a case and a game execution section, wherein the improvement comprises:
a switch for setting an amount of money to be spent for a game, a game end switch, and a slot for inserting a credit medium on which data certifying that credit is given is recorded;
a mechanism for sealing the credit medium in a packing device for sealing the same;
a control section responsive to operating of said setting switch for processing so that a game is played in the range of the setup amount of money and for processing data occurring as the game is played;
a write section responsive to operating of said end switch for recording the result of data processing performed by said data processing section on a provided adjustment medium for recording data; and
a section for discharging said packing device in which the credit medium is sealed and said adjustment medium on which data is recorded by said write section.

11. The game machine as claimed in claim 10 further including a credit medium read section for reading data recorded on the credit medium inside said slot.

12. The game machine as claimed in claim 11 wherein said write section further writes at least: a part of data read by said credit medium read section onto said adjustment medium.

13. The game machine as claimed in claim 12 wherein said adjustment medium is disposed on said packing device.

14. The game machine as claimed in claim 10 wherein said game execution section is provided to execute a game when a game play medium is loaded, further including a store section which stores the game play medium and has an inlet for loading the game play medium into said game execution section and a dispensing control section being responsive to the game result at said game execution section for dispensing game play media through said store section for winning plays.

15. An adjustment device for adjustment based on an adjustment medium, on which a game result is recorded, discharged from a game machine, wherein the improvement comprises:
a case having a slot for inserting the adjustment medium and a packing device sealing a credit medium on which data certifying that credit is given is recorded;
a section for removing the credit medium from said packing device inserted in the slot;
a read section for reading data recorded on said adjustment medium; and
a data processing section for performing adjustment processing based on the data read by said adjustment medium read section.

16. The adjustment device as claimed in claim 15 wherein said case further includes a display section which displays data on the credit medium, an amount of money spent, and an amount of money won read from the adjustment medium.

17. A packing device for sealing a credit medium on which data certifying that credit is given is recorded, said device comprising:
a case having an internal space for housing the credit medium and a slot for inserting the credit medium into the internal space;
a holder for holding the credit medium inserted in said case;
a shutter disposed at said slot in such a manner that it can be opened and closed; and
a mechanism for opening and closing said shutter,
said mechanism comprising:
a member for energizing in a direction of opening the slot;
a shutter cam being housed movably back and forth within said case for pushing out said shutter in a direction of closing the slot when it advances;
a gear being housed rotatably in said case for displacing said shutter cam back and forth; and
an insertion hole of a rotation drive member of a drive of said gear.

18. The packing device as claimed in claim 17 wherein said case is formed with an adjustment medium having a recording area where data can be read and written.

19. The packing device as claimed in claim 18 wherein said gear having a first pin engaged with said holder and a second pin engaged with said shutter cam and has a structure whereby when the first pin moves as said holder retreats, the second pin moves in a direction of advancing said shutter cam and when the first pin moves in a direction of advancing said holder, the second pin moves in a direction of retreating said shutter cam.

20. The packing device as claimed in claim 18 further including a device for sending a signal for detecting taking-out of said packing device to the outside of a game parlor.

* * * * *